United States Patent
Takayama et al.

(10) Patent No.: US 6,203,603 B1
(45) Date of Patent: Mar. 20, 2001

(54) ERASABLE IMAGE FORMING MATERIAL

(75) Inventors: Satoshi Takayama; Shigeru Machida, both of Kawasaki; Kenji Sano, Tokyo; Koichi Tsunemi, Chofu; Shuitsu Sato, Tokyo, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/365,840

(22) Filed: Aug. 3, 1999

(30) Foreign Application Priority Data

Aug. 4, 1998 (JP) ................................. 10-220468
Aug. 4, 1998 (JP) ................................. 10-220501

(51) Int. Cl.$^7$ ................................. C09D 11/00
(52) U.S. Cl. ................................. 106/31.16; 106/31.17; 106/31.23; 106/31.32; 106/31.36
(58) Field of Search ............... 106/31.16, 31.17, 106/31.2, 31.23, 31.32, 31.36; 523/161, 162

(56) References Cited

U.S. PATENT DOCUMENTS

| | | |
|---|---|---|
| 4,028,118 | 6/1977 | Nakasuji et al. . |
| 5,527,385 | 6/1996 | Sumii et al. . |
| 5,663,115 | 9/1997 | Naito et al. . |
| 5,849,651 | 12/1998 | Takayama et al. . |
| 5,922,115 | 7/1999 | Sano et al. . |
| 6,017,386 | * 1/2000 | Sano et al. ................. 106/31.32 |

OTHER PUBLICATIONS

Database WPI, Derwent Publications, AN 1998–267331, JP 10 088046, Apr. 7, 1998.
Database WPI, Derwent Publications, AN 1998–060158, JP 62 014163, Jan. 22, 1997.
Patent Abstracts of Japan, vol. 16, No. 169 (M–1239), Apr. 23, 1992, JP 04 014482, Jan. 20, 1992.
Patent Abstracts of Japan, vol. 1995, No. 6, Jul. 31, 1995, JP 07 081236, Mar. 28, 1995.
K. Taguchi, J. American Chemical Society, vol. 108, pp. 2705–2709, "Transient Binding Mode of Phenolphthalein–β–Cyclodextrin Complex: An Example of Induced Geometrical Distortion," 1986.

* cited by examiner

*Primary Examiner*—Mark L. Bell
*Assistant Examiner*—Veronica F. Faison
(74) *Attorney, Agent, or Firm*—Oblon, Spivak, McClelland, Maier & Neustadt, P.C.

(57) ABSTRACT

An erasable image forming material includes a color former, a developer, a binder resin, and a polymer decolorizer having an electron donating group capable of physically or chemically adsorbing the developer. This polymer decolorizer is, e.g., a polymer compound having a sugar skeleton, representatively starch. This image forming material can form sharp images and erase images by heat or a solvent to achieve a good erased state.

15 Claims, 11 Drawing Sheets

ERASABLE IMAGE FORMING MATERIAL

BACKGROUND OF THE INVENTION

The present invention relates to an image forming material that is used in electrophotography of, e.g., printers, plain paper copiers, and facsimile machines, thermal transfer recording, writing tools, and printing and can be erased after image formation.

With the recent progress of office automation, the amounts of various pieces of information are significantly increasing, and information output is increasing accordingly. Information output is represented by display output and hard copy output from printers to paper sheets. Display output requires large-scale circuit boards in display units and hence has problems in portability and cost. Hard copy output is the most basic image display means and superior in versatility and storage stability. However, hard copy output uses large amounts of paper as a recording medium when the information amount increases, and this leads to an increase in deforestation. Forest resources are very important to maintain the terrestrial environment and suppress the greenhouse effect caused by carbon dioxide. Therefore, it is an important subject to minimize future deforestation and efficiently use the paper resources that we presently possess.

Conventionally, paper resources are recycled by processing sheets of paper on which image forming materials are printed using large amounts of a bleaching agent and water and remaking paper fibers to manufacture recycled paper with low paper quality. This method raises the cost of recycled paper and causes new environmental pollution resulting from waste liquor disposal.

Formerly, paper sheets are reused by correcting images using rubber erasers to pencils and ink erasers to writing inks. However, these methods have low correction efficiency, and the reuse itself has its limit. Recently, rewritable paper has been proposed to reuse hard copy paper sheets. Unfortunately, this rewritable paper is applicable only to thermal recording and is not recyclable, although it is reusable, because it is special paper.

The present inventors are developing an image forming material that contains a color former, a developer, and a decolorizer compatible with these components, can form images in the same manner as common image forming materials, and allows formed images to be erased by processing the material with heat or a solvent. Use of this erasable image forming material makes it possible to repeatedly reuse paper sheets any number of times by returning the paper sheets to blank paper sheets by erasing images, with minimum degradation of paper quality. Since recycle need only be done when the paper quality significantly degrades by the reuse, the use efficiency of paper resources greatly improves. In this manner, the essential paper use amount can be reduced, so deforestation can be minimized. Additionally, it is possible to minimize any increase in cost of recycle paper and the environmental pollution by waste liquor disposal, that are problems in the present recycle system.

The image forming material being developed by the present inventors and containing a color former, a developer, a decolorizer, and a binder resin can form images in the same manner as common electrophotographic toner and can be erased by a solvent or heating. However, this image forming material sometimes varies the image reflection density depending on the manufacturing lots or causes defective fixation (offset) when images are thermally fixed. Also, when images are erased with a solvent, marks of a flow of the image forming material or blurred images partially form, and unerased images sometimes remain. Since these unerased images limit the reuse of paper sheets, the material must be improved to be able to decolor formed images as completely as possible.

Also, depending on the intended use of the image forming material, it is preferable to be able not only to completely erase images but also to repeatedly write and erase images. Accordingly, an image forming material applicable to such a use is also being demanded.

BRIEF SUMMARY OF THE INVENTION

It is an object of the present invention to provide an image forming material that can form sharp images, can erase images by heat processing or solvent processing, and can be erased well without any defect.

It is another object of the present invention to provide an image forming material capable of repetitively writing and erasing images as well as completely erasing them.

The first erasable image forming material of the present invention comprises a color former, a developer, a matrix agent, and a polymer decolorizer having an electron donating group capable of physically or chemically adsorbing the developer.

The polymer decolorizer is preferably at least one compound selected from the group consisting of a polymer compound having a sugar skeleton, polyamino acid, a polymer compound having a hydroxyl group, a polymer compound having an amino group, polyvinylacetal, polyacrylonitrile, and their copolymers.

The second erasable image forming material of the present invention comprises a color former, a developer, a matrix agent in which a total number of electron donating groups is 5% or less of a total number of carbon atoms, and a decolorizer, wherein the color former and the developer are separated from the decolorizer by a microcapsule.

The third erasable image forming material of the present invention comprises a color former, a developer, a matrix agent in which a total number of electron donating groups is 5% or less of a total number of carbon atoms, a decolorizer, and a polymer filler having a glass transition point or softening point higher by 20° C. or more that of the matrix agent, wherein the color former and the developer are phase-separated from or co-dispersed in the polymer filler.

The fourth erasable image forming material of the present invention comprises a core containing a color former, a developer, and a matrix agent in which a total number of electron donating groups is 5% or less of a total number of carbon atoms, a polymer filler externally added to the core, and a decolorizer contained in at least one of the core and the polymer filler.

The first to fourth image forming materials are used in applications in which an image is formed on a paper sheet (image recording medium) by a colored image forming material and completely decolored to allow the paper sheet to be reused.

The fifth erasable image forming material of the present invention comprises a color former, a developer, a decolorizer, a matrix agent in which a total number of electron donating groups is 5% or less of a total number of carbon atoms, and an organic solvent having a boiling point of 150° C. or more.

The sixth erasable image forming material of the present invention comprises a microcapsule containing a color former, a developer, and an organic solvent having an electron donating group, a decolorizer, and a matrix agent in which a total number of electron donating groups is 5% or less of a total number of carbon atoms.

The seventh erasable image forming material of the present invention comprises a microcapsule containing a color former, a microcapsule containing a developer, a matrix agent in which a total number of electron donating groups is 5% or less of a total number of carbon atoms, and a decolorizer.

The eighth erasable image forming material of the present invention comprises a color former, a developer, a reversible decolorizer, one of a compatible decolorizer and a phase separation inhibitor, and a matrix agent in which a total number of electron donating groups is 5% or less of a total number of carbon atoms.

The fifth to eighth image forming materials are used in applications in which reversible coloration and decoloration of an image forming material on a paper sheet (image recording medium) are used. The paper sheet can be reused after an image is finally erased.

An image recording/erasing method of the present invention comprises the steps of forming a colorless image on an image recording medium by using the fifth, sixth, or seventh image forming material, coloring the image forming material under a first heating condition or a first pressing condition or by a contact of a first solvent, and decoloring the image forming material under a second heating condition or a second pressing condition or by a contact of a second solvent.

An image recording/erasing method of the present invention comprises the steps of forming a colored image on an image recording medium by using the eighth image forming material, decoloring the image forming material under a first heating condition or a first pressing condition or by a contact of a first solvent, coloring the image forming material under a second heating condition or a second pressing condition or by a contact of a second solvent, and decoloring the image forming material under a third heating condition or a third pressing condition or by a contact of a third solvent.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
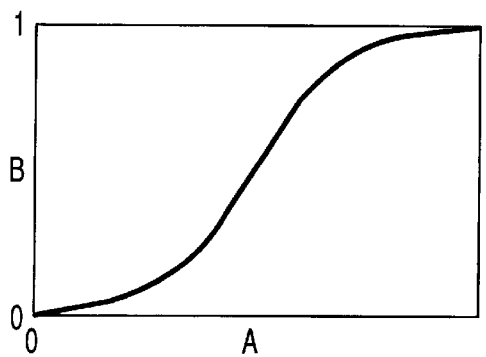
FIG. 1 is a graph showing the relationship between a ratio A of a polymer decolorizer to a developer and a ratio B of the developer fixed to the decolorizer when a mixture of the developer and the polymer decolorizer is subjected to erasure process.

The image forming material of the present invention can be used in various forms. Examples are electrophotographic toner for plain paper copiers (PPC), laser beam printers, and FAX machines; thermal printer ink; ink jet printer ink; printing ink for screen printing and type-printing; and ink for writing tools such as ball-point pens and fountain pens. Images can be formed on various image recording media by using the image forming material of the present invention. Representative examples of sheet image recording media are a paper sheet and a polymer film. Image recording media include vessels, packages, and structures to which sheet image recording media are attached. A colored image forming material formed on an image recording medium can be decolored by processing the material with a solvent or heat as will be described later.

The components of the image forming material of the present invention will be described below.

In the present invention, the color former is a precursor compound of a dye which forms colored information such as characters and graphics. The developer is a compound which develops the color former by interacting with it. The color former and the developer develop a color when the interaction between them increases and lose the color when the interaction reduces. In the following description, the color former and the developer in colored state will be referred to as dye components in some instances. The decolorizer is a compound that traps preferentially the developer when heated or in the presence of a solvent. The image forming material according to the first invention contains a polymer decolorizer as an essential component. In the image forming materials according to the second to eighth inventions, either a lower-molecular decolorizer or a polymer decolorizer can be used. Low-molecular decolorizers are classified into a reversible decolorizer, a compatible decolorizer, and a phase separation inhibitor in accordance with the stability of the decolored state of an image as will be described later.

When solidified, these three components, i.e., the color former, developer, and decolorizer can take the following two states:

(1) A colored state in which the decolorizer is mixed with the color former and the developer in an amount that corresponds to the equilibrium solubility, and the excess color former and developer over the equilibrium solubility are phase-separated from the decolorizer, with the result that the interaction between the color former and the developer is increased to develop color.

(2) A decolored state in which the decolorizer absorbs a larger amount of developer than the equilibrium solubility, with the result that the interaction between the color former and the developer is decreased to lose color.

Changes between the colored and decolored states are effected in accordance with the principle described below. At room temperature, a condition in which the phase of the color former and the developer is separated from the phase of the decolorizer is close to room temperature equilibrium. In this condition, the composition system is colored, since the color former and the developer interact with each other. When the composition system in this state is heated up to its softening point or higher, the bonding between the color former and the developer breaks down, and the developer is preferentially absorbed with the decolorizer. As a result, the interaction between the developer and the color former is lost, leading to decoloring. When the system is forcedly solidified by cooling rapidly from the molten state, the decolorizer takes the developer into itself in a large amount exceeding the room temperature equilibrium solubility. As a result, the system turns amorphous and colorless at room temperature. Although the amorphous composition system is non-equilibrated in a relative sense, the amorphous system exhibits a sufficiently long life at temperatures not higher than its glass transition point Tg. Therefore, if Tg is not lower than room temperature, the system does not easily transform from the amorphous to the equilibrium state.

When a solvent is used on an image forming material containing the three components, i.e., the color former, developer, and decolorizer, the material can be changed from the colored to the decolored state by the same principle as above. Images can also be erased by using a solvent containing a decolorizer on an image forming material containing a color former and developer.

The term "decoloration" or "erasure" means that (a) the reflection density of the image region after the erasure treatment is lowered to ⅓ or less of the reflection density of the image formed, or (b) the difference between the reflection density in the image region after the erasure treatment and the reflection density of the background is lowered to 0.1 or less. It is desirable to meet both of these conditions (a) and (b).

Examples of the color former are electron-donating organic substances such as leucoauramines, diarylphthalides, polyarylcarbinoles, acylauramines, arylauramines, Rhodamine B lactams, indolines, spiropyrans, and fluorans.

Practical examples of the color former are Crystal Violet lactone (CVL), Malakite Green lactone,
- 2-anilino-6-(N-cyclohexyl-N-methylamino)-3-methylfluoran,
- 2-anilino-3-methyl-6-(N-methyl-N-propyl-amino) fluoran,
- 3-[4-(4-phenylaminophenyl)aminophenyl]-amino-6-methyl-7-chlorofluoran,
- 2-anilino-6-(N-methyl-N-isobutylamino)-3-methylfluoran,
- 2-anilino-6-(dibutyl-amino)-3-methylfluoran,
- 3-chloro-6-(cyclohexylamino)-fluoran,
- 2-chloro-6-(diethylamino)fluoran,
- 7-(N,N-diethylamino)-3-(N,N-diethylamino)fluoran,
- 3,6-bis(diethylamino)fluoran-γ-(4'-nitroanilino)lactam,
- 3-diethylaminobenzo[a]-fluoran,
- 3-dietylamino-6-methyl-7-aminofluoran,
- 3-diethylamino-7-xylidino-fluoran,
- 3-(4-diethylamino-2-ethoxyphenyl)-3-(1-ethyl-2-methylindole-3-yl)-4-azaphthalide,
- 3-(4-diethylaminophenyl)-3-(1-ethyl-2-methylindole-3-yl) phthalide, 3-diethylamino-7-chloroanilinofluoran,
- 3-diethylamino-7,8-benzofluoran,
- 3,3-bis(1-n-butyl-2-methylindole-3-yl)phthalide,
- 3,6-dimethylethoxyfluoran,
- 3,6-diethylamino-6-methoxy-7-aminofluoran, DEPM, ATP, ETAC, 2-(2-chloroanilino)-6-dibutylaminofluoran, Crystal Violet carbinol, Malachite Green carbinol, N-(2,3-dichlorophenyl) leucoauramine, N-benzoylauramine, Rhodamine B lactam, N-acetylauramine, N-phenylauramine, 2-(phenyliminoethanedilydene)-3,3-dimethylindoline, N,3,3-trimethylindolinobenzospiropyran,
- 8'-methoxy-N,3,3-trimethylindolinobenzospiropyran,
- 3-diethyl-amino-6-methyl-7-chlorofluoran,
- 3-diethylamino-7-methoxyfluoran,
- 3-diethyamino-6-benzyloxyfluoran,
- 1,2-benzo-6-diethyaminofluoran,
- 3,6-di-p-toluidino-4,5-dimetylfluoran,
- phenylhydrazide-γ-lactam, and 3-amino-5-methylfluoran.

These color former compounds can be used singly or in the form of a mixture of two or more species. If color formers are selected properly, a variety of colored states can be obtained, and thus a multicolor image can be formed.

Examples of the developer are phenols, metal phenolates, carboxylic acids, metal carboxylates, benzophenones, sulfonic acids, sulfonates, phosphoric acids, metal phosphates, acidic phosphoric esters, acidic phosphoric ester metal salts, phosphorous acids, and metal phosphites. These developers can be used singly or in the form of a mixture of two or more species.

Practical examples of the developer are gallic acid; gallates such as methyl gallate, ethyl gallate, n-propyl gallate, i-propyl gallate, and butyl gallate; dihydroxybenzoic acids and their esters such as 2,3-dihydroxybenzoic acid and 3,5-dihydroxybenzoic acid methyl; acetophenone derivatives such as 2,4-dihydroxyacetophenone, 2,5-dihydroxyacetophenone, 2,6-dihydroxyacetophenone, 3,5-dihydroxyacetophenone, and 2,3,4-trihydroxyacetophenone; benzophenone derivatives such as 2,4-dihydroxybenzophenone, 4,4'-dihydroxybenzophenone, 2,3,4-trihydroxybenzophenone, 2,4,4'-trihydroxybenzophenone, 2,2',4,4'-tetrahydroxybenzophenone, and 2,3,4,4'-tetrahydroxybenzophenone; biphenols such as 2,4'-biphenol and 4,4'-biphenol; and polyhydric phenols such as 4-[(4-hydroxyphenyl)methyl]-1,2,3-benzenetriol, 4-[(3,5-dimethyl-4-hydroxyphenyl)methyl]-1,2,3-benzenet riol, 4,6-bis[(3,5-dimethyl-4-hydroxyphenyl)methyl]-1,2,3-benzenetriol, 4,4'-[1,4-phenylenebis(1-methylethylidene)bis (benzene-1,2,3-triol)], 4,4'-[1,4-phenylenebis(1-methylethylidene)bis(1,2-benze nediol)], 4,4',4"-ethylidenetrisphenol, 4,4'-(1-methylethylidene)bisphenol, and methylenetris-p-cresol. Of these compounds, most suitable examples of the developer are gallates, 2,3-dihydroxybenzoic acids, dihydroxybenzoic acid esters, hydroxyacetophenones, hydroxybenzophenones, and biphenols.

In the present invention, the matrix agent means a binder resin used to hold the individual components of an image forming material, a wax component used to adjust the physical properties of an image forming material, or a vehicle added to a liquid image forming material such as liquid ink.

The binder resin is not particularly limited as long as the resin is used in common electrophotographic toner, liquid ink, ink ribbon, and writing ink. As a toner binder resin, a resin having a glass transition point (Tg) of 40° C. or more is preferably used from the viewpoint of temperature stability. Practical examples are polystyrene, a styrene-acrylate copolymer, a styrene-methacrylic acid copolymer, a styrene-methacrylate copolymer, polyester, an epoxy resin, a styrene-butadiene copolymer, a styrene-propylene copolymer, styrene-butadiene rubber, a styrene-maleic ester copolymer, and a styrene-maleic anhydride copolymer. As a thermal transfer ink binder resin, a resin having a Tg of 70° C. or less is preferably used from the viewpoint of thermal transfer sensitivity. Practical examples are an ethylene-vinyl acetate copolymer and polyester. These binder resins can be used singly or blended.

As the wax component, it is possible to use higher alcohols, higher ketones, higher aliphatic esters, low-molecular weight polypropylenes, low-molecular weight polyethylenes, low-molecular weight polybutylenes, low-molecular weight polyalkanes, and natural waxes such as rice wax. The acid value of the wax component is preferably 10 or less. The weight-average molecular weight of the wax component is preferably $10^2$ to $10^5$, and more preferably, $10^2$ to $10^4$.

First, the image forming material of the first invention will be described in more detail below. In this first invention, the polymer decolorizer is a polymer compound having an electron donating group capable of physically or chemically adsorbing the developer. The electron donating group is not particularly limited as long as the group has the function of physically or chemically adsorbing the developer. Preferable examples are a hydroxyl group, acyl group, oxo group, carbonyl group, oxycarbonyl group, amino group, and aromatic amino group.

When the image forming material containing the polymer decolorizer is brought into contact with an erase solvent or heated to the softening point or higher, the developer combining with the color former is selectively adsorbed by the electron donating group of the polymer decolorizer and can no longer function together with the color former. As a consequence, the image forming material changes from the colored to the decolored state. The polymer decolorizer has a higher functional group concentration per unit volume than that of a low-molecular decolorizer. Therefore, the polymer decolorizer efficiently adsorbs the developer and stably holds the developer by enclosing it in a polymer chain. Since the polymer decolorizer intertwines with the matrix agent, the polymer decolorizer does not flow out together with an erase solvent when the image forming material is brought into contact with the solvent to erase an image. Hence, the developer adsorbed by the polymer decolorizer can be stably held, so no defect is caused by a flow of colored dye components or by a partial image blur.

The polymer decolorizer is preferably selected from the group consisting of a polymer compound having a sugar skeleton, polyamino acid, a polymer compound having a hydroxyl group, a polymer compound having an amino group, polyvinylacetal, polyacrylonitrile, and their copolymers. The average molecular weight of the polymer decolorizer is preferably 800 or more, and more preferably, 10,000 or more. A polymer compound having a sugar skeleton in which the average molecular weight is 800 or more is trisaccharide or larger.

Examples of this polymer compound having a sugar skeleton are starch such as α-starch, β-starch, corn starch, potato starch, and dogtooth violet starch; grain powders containing starch as its main component such as wheat flour, barley flour, rye flour, and rice flour; starch derivatives such as methylstarch, ethylstarch, acetylstarch, and nitrostarch; cellulose; cellulose derivatives such as cellulose acetate, methylcellulose, ethylcellulose, and nitrocellulose; polysaccharides and their derivatives such as dextrin, dextran, mannan, amylopectin, amylose, xylan, glycogen, inulin, lichenin, chitin, hemicellulose, pectin, vegetable gum, agarose, carrageenin, and saponin.

The polymer compound having a sugar skeleton is obtainable as a very fine powder and can be uniformly dispersed together with the other components, e.g., the binder, of the image forming material by kneading. Additionally, it is unnecessary to heat to high temperatures during the kneading.

When the polymer compound having a sugar skeleton is used as a polymer decolorizer for toner, an effect of preventing offset (a phenomenon in which a portion of toner adheres to the surface of a heat roller) can also be obtained during thermal fixation on a paper sheet. This is presumably because the polymer compound having a sugar skeleton has a high affinity for fibers of paper as an image recording medium and therefore has a function of increasing the adhesion of the image forming material to paper. This function is particularly notable in starch and its derivatives. If offset occurs to roughen the surface of the binder resin, the dye components in the image forming material readily flow during solvent erasure on a paper sheet. This disables the polymer decolorizer to well adsorb the developer, resulting in defect. Accordingly, improvement of the offset leads to improvement of the image erasing quality.

The polymer decolorizer made from the polymer compound having a sugar skeleton also has the function of the binder resin. However, if the content of the polymer decolorizer is too large, the humidity resistance of the image forming material declines. The humidity resistance of the image forming material can be improved by substituting a portion of a hydroxyl group contained in the sugar skeleton with an acetyl group or the like. The ratio of substitution of a hydroxyl group with an acetyl group or the like is preferably determined in accordance with the content of the polymer decolorizer in the image forming material.

Polyamino acid used as the polymer decolorizer is a homopolymer of amino acid having a hydroxyl group, amino group, or oxycarbonyl group and a derivative of this amino acid, or a copolymer containing 5% or more of this amino acid and its derivative. Practical examples are threonine, serine, cystine, hydroxyproline, tryptophan, aspartic acid, glutamic acid, arginine, lycine, ornithine, and histidine.

Glycoprotein as a combination of sugar and protein also functions as the polymer decolorizer. Examples of this glycoprotein are collagen, Taka-amylase A, casein, germ glycoprotein, and egg albumin.

A polymer compound having a hydroxyl group usable as the polymer decolorizer means a polymer compound capable physically or chemically adsorbing the developer by donating electrons from lone electron-pairs of oxygen atoms. From this viewpoint, a phenol resin that has a phenolic hydroxyl group and exhibits a developing function is not included in the polymer decolorizer. Polyvinyl alcohol is a representative example of the polymer compound having a hydroxyl group. Although polyvinyl alcohol also has the function of the binder resin, the humidity resistance of the image forming material decreases if the content is too large. The humidity resistance of the image forming material can be improved by substituting a portion of a side-chain hydroxyl group of polyvinyl alcohol with an acetyl group, an alkyl group, or the like. In this case, as described in the above case, the ratio of substitution of a hydroxyl group with an acetyl group or the like is preferably determined in accordance with the content of the polymer decolorizer in the image forming material.

A polymer compound having an amino group usable as the polymer decolorizer means a polymer compound capable of physically or chemically adsorbing the developer by donating electrons from lone electron-pairs of nitrogen atoms. This polymer compound may or may not have an aromatic ring. Preferable examples of the polymer compound having an amino group are homopolymers such as polyvinylpyridine, polyvinylpyrazine, polyvinylpyrimidine, polyvinylimidazole, polyvinylpyrrole, polyvinylcarbazole, polyvinylpyrrolidine, polyvinylpiperidine, polyvinylpiperazine, and polyvinylmorpholine, and a copolymer containing 5% or more of any of these monomers containing an amino group.

A polymer compound in which an amino group is introduced to the benzene ring of polystyrene is also usable as the polymer decolorizer. Practical examples are polyvinylaniline, polystyrene substituted by a quaternary ammonium salt used as an anion exchange resin, polystyrene substituted by an amino group having an ethylenediamine skeleton, and their derivatives. The substitution ratio of an amino group is preferably 5% or more.

A method of determining an optimum polymer decolorizer content in the erasable image forming material of the first invention will be described below. When the ratio of the decolorizer contained in the image forming material is increased, the excess decolorizer reacts with the developer to decrease the initial image density. If the content of the decolorizer is too small, the decolorizer cannot well fix the developer when the image forming material is erased by heat or a solvent, and this lowers the decoloring quality. As described above, the ratio (B=fixed developer/whole developer) of the developer fixed to the decolorizer changes in accordance with the ratio (A=polymer decolorizer/developer) of the polymer decolorizer to a given amount of developer. In other words, the ratio B of the developer fixed to the decolorizer is referred to as a reaction ratio. Accordingly, to meet the image density and decoloring characteristic of the erasable image forming material, the ratio A is limited in a certain range. This range of the ratio A can be experimentally obtained by measuring the endotherm of the developer as follows.

Many developers such as phenols, carboxylic acids, acid esters, and metal salts are hydrophilic and crystalline. Therefore, when differential scanning calorimetry (DSC) is performed such a substance exhibits a sharp endothermic peak at the inherent melting point of the substance. However, when the developer reacts with the polymer decolorizer and is fixed to it, it turns to be amorphous state, so that the endothermic peak of the developer disappears. Accordingly, the ratio B at which the developer is fixed to the polymer decolorizer can be known by running DSC for a mixture of developer and polymer decolorizer. More specifically, the endotherm Q per unit mass of the developer is calculated by dividing the endothermic peak area by the mass of the developer contained in a sample, and this endotherm Q of the mixture (Q1) is compared with that of the developer (Q0). That is, $$B=1-Q1/Q0$$

Figure 2:
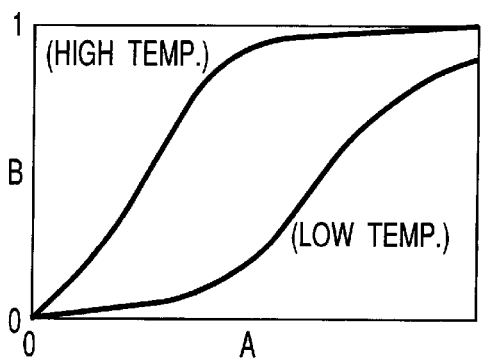
FIG. 2 is a graph showing the relationships between A and B when the mixture of the developer and the polymer decolorizer is heated at high and low temperatures.

By preparing mixtures having different mixing ratios A and running DSC after erasure (by heating or solvent addition), the relationship between A and B after the erasure is obtained (FIG. 1). As the ratio A of the decolorizer increases, the developer is fixed more easily, so the ratio B increases. This relationship depends on the processing performed for the sample. For example, when heating is performed, the developer fixing reaction is promoted when the sample is held at a high temperature for a long time, so the ratio B increases (FIG. 2). Therefore, the range of A meeting the characteristics of an image forming material can be examined by performing processing, which is equivalent to processing performed in preparation or decoloring of the image forming material, for a mixture and performing DSC for this sample to obtain the relationship between A and B in each state.

In the present invention, a compositional ratio A of the decolorizer to the developer should preferably be within a range, the lower limit of which is determined by an A value where a reaction ratio between the developer and the decolorizer becomes 70% or more after erasure treatment, and the upper limit of which is determined by an A value where a reaction ratio between the developer and the decolorizer becomes 30% or less after these two components are mixed at a maximum temperature for preparation of the image forming material.

More specifically, the upper and lower limits of the content of the polymer decolorizer in the mixture are obtained as follows.

Figure 3:
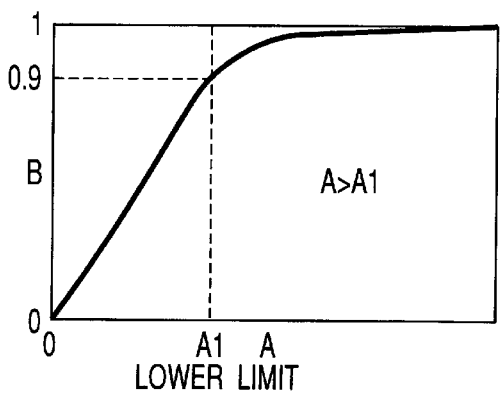
FIG. 3 is a graph showing the relationship between A and B obtained by DSC after decoloring treatment.

The lower limit of the content of the polymer decolorizer is obtained as follows. First, several mixtures having different mixing ratios A are prepared. These mixtures are (1) heated to a thermal erasure temperature, e.g., 200° C. and returned to room temperature (corresponding to erasure by heat) or (2) exposed to an erase solvent and dried (corresponding to erasure by a solvent). After that, DSC is performed to obtain the relationship between the mixing ratio A and the ratio B of the fixed developer (FIG. 3). In order for the image forming material to decolor when processed by heat or a solvent, B must have a sufficiently large value. For example, letting A1 be the mixing ratio when B is 90%, the content A of the polymer decolorizer must satisfy A>A1.

Figure 4:
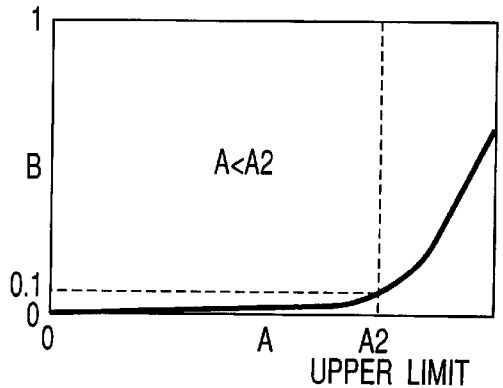
FIG. 4 is a graph showing the relationship between A and B obtained by DSC after mixing at a temperature for preparation of image forming material.

The upper limit of the content of the polymer decolorizer is obtained as follows. Samples having different mixing ratios A are prepared as described above, and the same processing as performed in the manufacture of the image forming material is performed. For example, when toner is to be prepared, the material is heated to a kneading temperature (70 to 80° C.) and returned to room temperature. After that, DSC is performed to obtain the relationship between A and B (FIG. 4). To sufficiently develop a color in the manufacture of the image forming material, the developer is desirably not fixed to the decolorizer. Therefore, letting A2 be the mixing ratio when B is 10%, for example, the content A of the polymer decolorizer must be decreased to satisfy A<A2.

From the foregoing, the ratio A of the polymer decolorizer, contained in the erasable image forming material of the first invention, to the developer must satisfy A1<A<A2. Since A1 and A2 change in accordance with the physical and chemical properties of the polymer decolorizer, whether a certain material is adequate as the decolorizer can be checked by conducting this test.

Preferable blending ratios of the color former, developer, and polymer decolorizer in the image forming material of the first invention are as follows. The blending ratio of the developer is preferably 0.1 to 10 parts by weight, and more preferably, 0.3 to 2 parts by weight with respect to 1 part by weight of the color former. If the developer is less than 0.1 part by weight, the image forming material cannot well develop a color by the interaction between the color former and the developer. If the developer exceeds 10 parts by weight, the interaction between the color former and the developer is difficult to sufficiently reduce. The blending ratio of the polymer decolorizer is preferably 1 to 200 parts by weight, and more preferably, 3 to 50 parts by weight with respect to 1 part by weight of the color former. If the polymer decolorizer is less than 1 part by weight, it is difficult to cause the state change of the image forming material between the colored state and the decolored state. If the polymer decolorizer exceeds 200 parts by weight, the color generation by the image forming material becomes insufficient.

The polymer decolorizer can be added not only to the image forming material but also to an image recording medium such as a paper sheet. The addition amount of the polymer decolorizer to an image recording medium is not particularly limited as long as images can be erased. However, this addition amount is preferably 5 to 20 wt % when the characteristics of an image recording medium are taken into consideration.

The polymer decolorizer alone can be added to the image forming material. Also, the polymer decolorizer can be used in combination with a low-molecular decolorizer. As this low-molecular decolorizer (to be described in more detail later), the following compounds can be used. (1) Cholic acid, lithocholic acid, testosterone, cortisone, and their derivatives. Practical examples are cholic acid, methylester cholate, sodium cholate, lithocholic acid, methylester lithocholate, sodium lithocholate, hyodeoxycholic acid, methylester hyodeoxycholate, testosterone, methyltestosterone, 11α-hydroxymethyltestosterone, hydrocortisone, cholesterolmethylcarbonate, and α-cholestanol. of these compounds, a compound having two or more hydroxyl groups is preferable. (2) Non-aromatic cyclic compounds of a 5-membered or larger ring having one or more hydroxyl groups. Practical examples are alicyclic monohydric alcohol (e.g., cyclodecanol), alicyclic dihydric alcohol (e.g., 1,4-cyclodecanediol, 1,2-cyclohexanediol, and 1,2-cyclododecanediol), sugars and their derivatives (e.g., glucose and saccharose), and alcohols having a cyclic structure (e.g., 1,2:5,6-diisopropyridene-D-mannitol).

In the present invention, the colored image forming material is erased by bringing the material into contact with a solvent or by heating and melting the material.

In the method of bringing the image forming material into contact with a solvent, a paper sheet is dipped in the solvent, or the solvent is sprayed onto a paper sheet. Examples of means of this method are a roller for dipping a paper sheet in the solvent contained in a vessel, a spray nozzle for spraying the solvent onto a paper sheet, a nozzle for dropping the solvent onto a paper sheet, and a gravure roller for supplying the solvent to a paper sheet.

The erase solvent used in the present invention is preferably a solvent having the following characteristics.

(1) The erase solvent preferably breaks the bond between the color former and the developer.

(2) The erase solvent preferably has a high affinity for the binder so as to be able to penetrate to the inside of the image forming material on the paper surface.

Suitable erase solvents are ethers, e.g., ethylether, ethylpropylether, tetrahydrofuran, tetrahydropyran, and dioxane; cellosolves, e.g., 2-methoxyethanol, 2-ethoxyethanol, 1,2-dimethoxyethane, and 1,2-diethoxyethane; ketones, e.g., acetone, methylethylketone, methylpropylketone, diethylketone, cyclopentanone, and cyclohexane; esters, e.g., ethyl acetate, ethyl lactate, methyl propionate, and ethyl butyrate; and methylene chloride, N-methylpyrrolidinone, dimethylformamide, dimethylacetamide, and dimethylsulfoxide. These solvents can be used singly or in the form of a mixture of two or more different solvents. If this is the case, the mixing ratio can be any arbitrary ratio.

In addition to the above solvents, some solvents can achieve the erasing characteristic depending on the type of matrix agent. Examples of such solvents are alcohols, e.g., methyl alcohol, ethyl alcohol, propyl alcohol, and isopropyl alcohol; and water and aqueous basic solutions. These solvents are particularly effective to an image forming material, such as crayon, in which the ratio of the wax component is large. Also, the image erasure efficiency sometimes rises when these solvents are added to the aforementioned erase solvent.

The above erase solvent can also be mixed with a solvent having a high affinity for the binder. Examples of this solvent are toluene, xylene, cresol, dimethoxybenzene, hexane, cyclohexane, cyclopentane, petroleum ether, and benzine.

In the present invention, the polymer decolorizer can also be added to the erase solvent. The addition amount of the polymer decolorizer to the erase solvent is not particularly restricted as long as images are erasable. However, this addition amount is preferably 5 to 20 wt %.

In the method of thermally erasing the image forming material, it is possible to apply various heating devices, e.g., arbitrary heating means such as a thermal printer head (TPH), laser head, thermal bar, hot stamp, heat roller, heat gun, fan heater, and heat lamp, and a large plant combining any of these means.

The image forming materials of the second to fourth inventions will be described below.

The present inventors have found that one cause of a flow mark of the image forming material and an image blur is evenness in dispersion of the decolorizer. This is probably because the decolorizer has high cohesive force and easily forms a cluster in the image forming material.

The matrix agent (binder resin or wax component) used in the second to fourth inventions is a compound (oligomer or polymer in the case of a resin) in which the total number of electron donating groups is 5% or less of the total number of carbon atoms.

The polymer filler used in the third and fourth inventions is a polymer compound existing in the form of a covering material, external additive, disperse particles, or binder for dispersing microcapsules in the image forming material and having a function of holding the image forming material in a desired structure. This polymer filler is preferably an oligomer or polymer in which the total number of electron donating groups exceeds 5% of the total number of carbon atoms.

The second image forming material has a structure in which the color former and the developer are separated from the decolorizer by microcapsules. These microcapsules are destroyed by an external stimulus such as light, heat, or a contact of a solvent. The material contained as a core in the microcapsule can be the dye components (color former and developer) or the decolorizer. Also, the dye components can be formed into microcapsules and covered with the polymer filler. This structure is advantageous to improve the dispersion and decreases variations in the manufacture of the image forming material.

The third image forming material has a structure in which the color former and the developer are phase-separated from or co-dispersed in the polymer filler. In this structure, the polymer filler must have a Tg or softening point higher by 20° C. or more (desirably 50° C. or more) than that of the matrix agent. Also, the image forming material is kneaded at a lower temperature than the Tg or softening point of the polymer filler.

The fourth image forming material has a structure in which a powder of the polymer filler is externally added by adhering the powder to the outer surface of a core containing the color former, developer, and matrix agent.

Figure 5A:
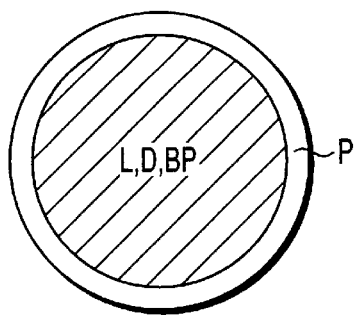
FIGS. 5A to 5X are sectional views showing toner particles according to the present invention.
Figure 5B:
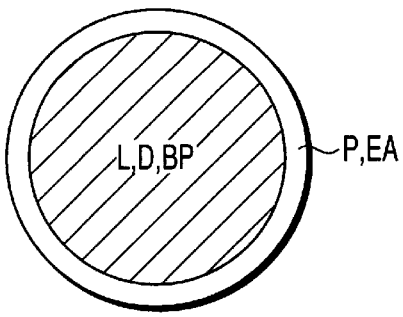
Figure 5C:
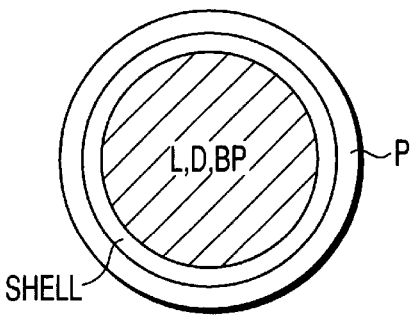
Figure 5D:
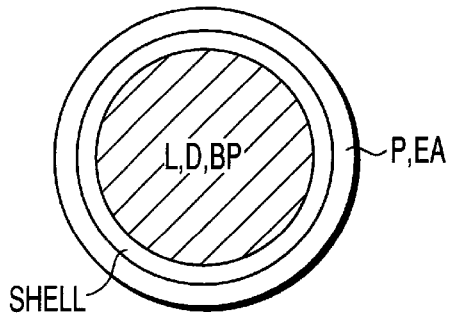
Figure 5E:
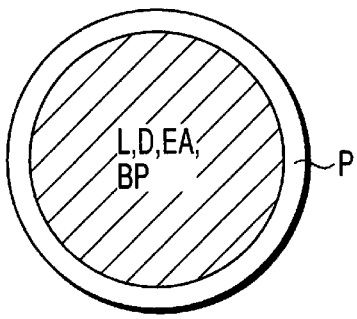
Figure 5F:
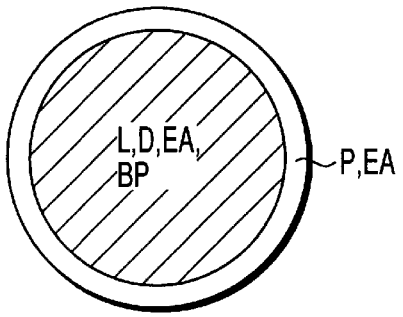
Figure 5G:
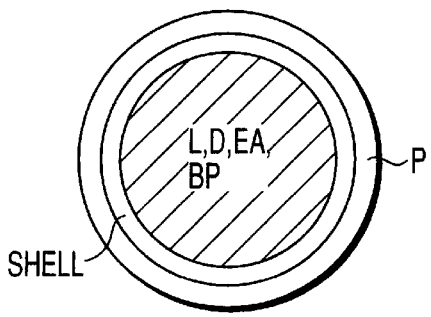
Figure 5H:
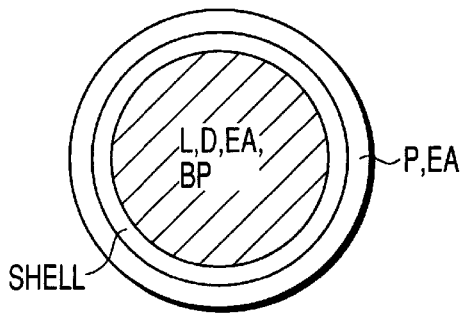

Practical structures of the second to fourth image forming materials will be described below with reference to FIGS. 5A to 5X by taking a toner particle as an example. In FIGS. 5A to 5X, reference symbol L denotes a color former; D, a developer; EA, a decolorizer or erasing agent; P, a polymer filler; and BP, a matrix agent (binder resin or wax component). Note that the phase-separated structure or co-dispersed structure of the third image forming material need not be structures in which the individual components are clearly separated from each other as shown in FIGS. 5A to 5X.

The toner particle shown in FIG. 5A has a structure in which a core containing a color former, developer, and matrix agent is covered with a polymer filler. The toner particle shown in FIG. 5C has a structure in which a microcapsule composed of a core containing a color former, developer, and matrix agent and a shell covering this core is covered with a polymer filler. The toner particle shown in FIG. 5E has a structure in which a core containing a color former, developer, matrix agent, and decolorizer is covered with a polymer filler. In other words, the decolorizer is dispersed in the core shown in FIG. 5A. The toner particle shown in FIG. 5G has a structure in which a microcapsule composed of a core containing a color former, developer, matrix agent, and decolorizer and a shell covering this core is covered with a polymer filler. In other words, the decolorizer is dispersed in the core shown in FIG. 5C. In these structures, the decolorizer can also be dispersed in the outermost polymer filler covering the core or the microcapsule (FIGS. 5B, 5D, 5F, and 5H). Also, in the structure shown in FIG. 5A or 5C the core can contain not only the matrix agent but also the polymer filler.

Figure 5I:
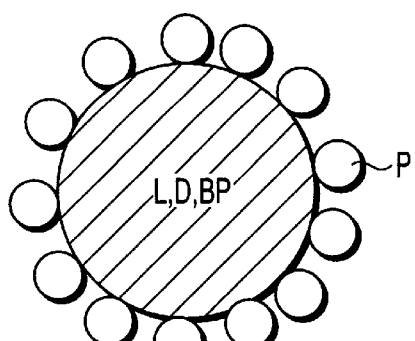
Figure 5J:
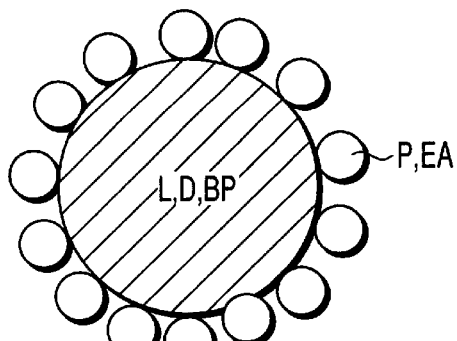
Figure 5K:
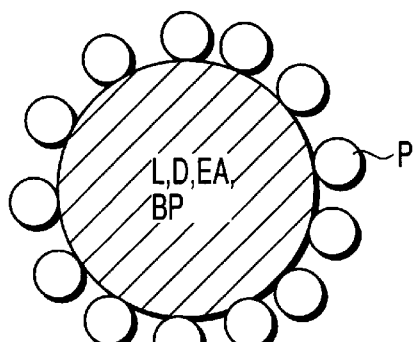
Figure 5L:
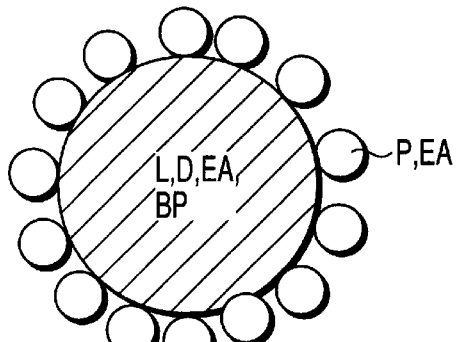

The toner particle shown in FIG. 5I has a structure in which a powder of a polymer filler is externally added by adhering the powder to the outer surface of a core (similar to the core shown in FIG. 5A) containing a color former, developer, and matrix agent. The toner particle shown in FIG. 5K has a structure in which a powder of a polymer filler is externally added by adhering the powder to the outer surface of a core (similar to the core shown in FIG. 5E) containing a color former, developer, matrix agent, and decolorizer. In these structures, the decolorizer can also be dispersed in the polymer filler powder to be externally added (FIGS. 5J and 5K). In the structure shown in FIG. 5I, the matrix agent can be omitted.

Figure 5M:
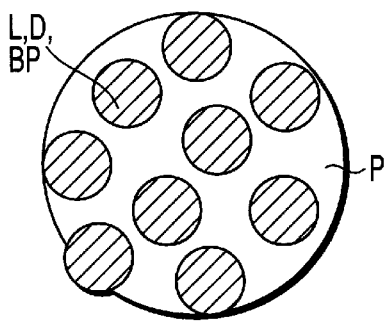
Figure 5N:
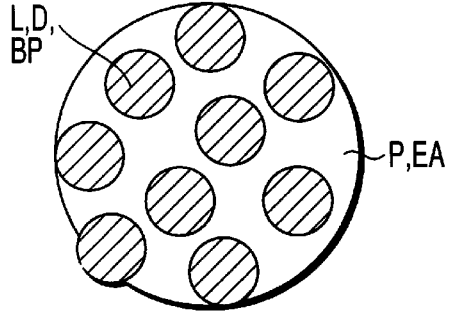
Figure 5O:
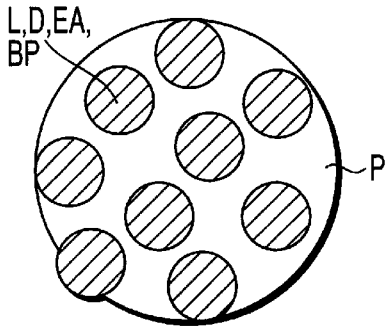
Figure 5P:
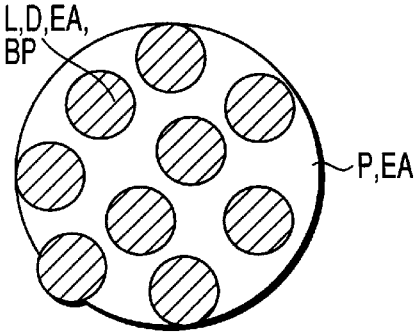
Figure 5Q:
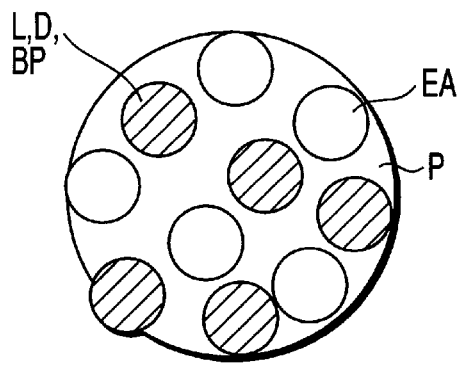

The toner particle shown in FIG. 5M has a structure in which a plurality of cores containing a color former, developer, and matrix agent are phase-separated in a polymer filler. The toner particle shown in FIG. 5O has a structure in which a plurality of cores containing a color former, developer, matrix agent, and decolorizer are phase-separated in a polymer filler. In other words, the decolorizer is dispersed in the cores shown in FIG. 5M. The toner particle shown in FIG. 5Q has a structure in which a plurality of cores containing a color former, developer, and matrix agent and a plurality of cores containing a decolorizer are phase-separated in a polymer filler. In theses structures, the decolorizer can also be dispersed in the polymer filler (FIGS. 5N and 5P). In the structures shown in FIGS. 5M and 5Q, the matrix agent can be omitted.

Figure 5R:
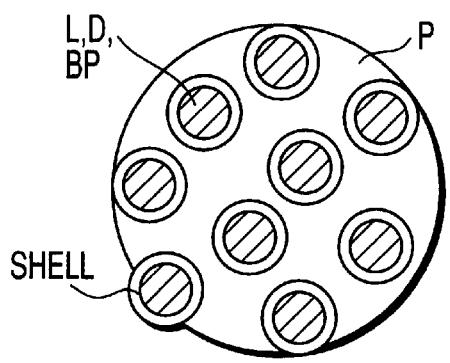
Figure 5S:
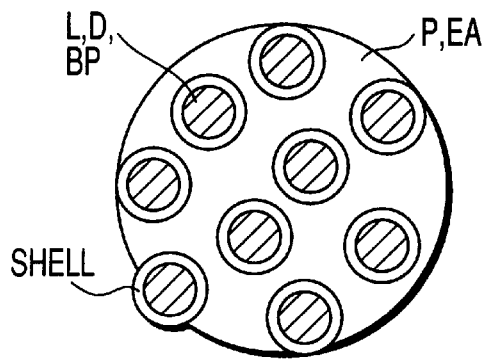
Figure 5T:
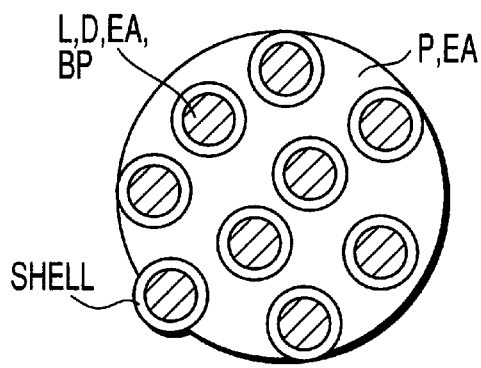
Figure 5U:
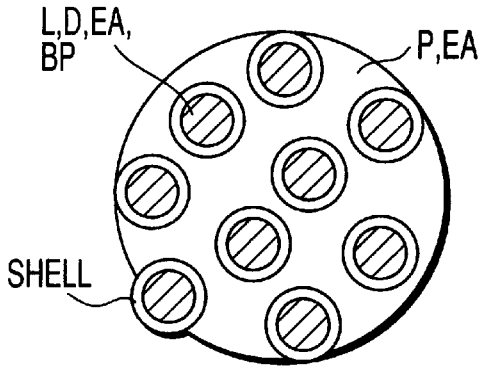
Figure 5V:
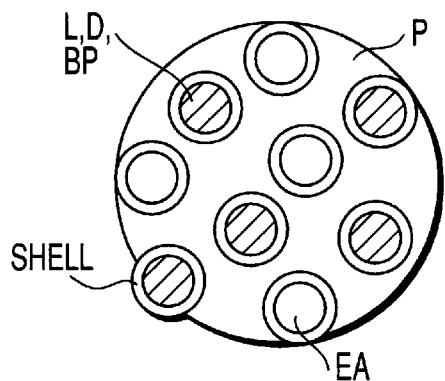

The toner particle shown in FIG. 5R has a structure in which a plurality of microcapsules each composed of a core containing a color former, developer, and matrix agent and a shell covering this core are dispersed in a polymer filler. The toner particle shown in FIG. 5T has a structure in which a plurality of microcapsules each composed of a core containing a color former, developer, matrix agent, and decolorizer and a shell covering this core are dispersed in a polymer filler. The toner particle shown in FIG. 5V has a structure in which a plurality of microcapsules each composed of a core containing a color former, developer, and matrix agent and a shell covering this core and a plurality of microcapsules each composed of a core containing a decolorizer and a shell covering this core are dispersed in a polymer filler. In other words, the structures shown in FIGS. 5R, 5T, and 5V are formed by interposing the shells between the cores and the polymer filler shown in FIGS. 5M, 5O, and 5Q to separate these cores from the polymer filler. The decolorizer can also be dispersed in the polymer filler (FIGS. 5S and 5U).

Figure 5W:
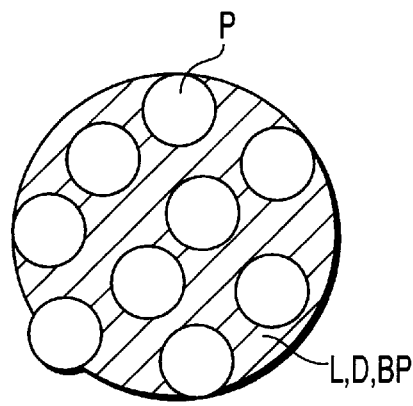
Figure 5X:
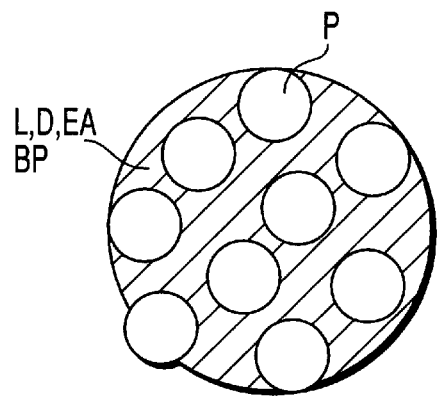

The toner particle shown in FIG. 5W has a structure in which a color former, developer, and matrix agent are evenly dispersed and a polymer filler is phase-separated or pigment-dispersed. The toner particle shown in FIG. 5X has a structure in which a color former, developer, decolorizer, and matrix agent are evenly dispersed and a polymer filler is phase-separated or pigment-dispersed.

These structures have both merits and demerits. For example, the toner particle containing a plurality of cores as shown in any of FIGS. 5M to 5X can be erased well particularly when erased by a solvent, compared to the toner particle having a single core. However, this toner particle complicates the manufacturing process. The microcapsule structure in which a core is covered with a shell has high image holding ability and stability. The phase-separated structure in which cores are simply dispersed simplifies the manufacturing process. However, a material having a Tg or softening point higher by 20° C. or more than that of the binder resin must be used as the polymer filler. Also, when the decolorizer is dispersed in the polymer filler exposed to the outermost surface, a good erased state can be obtained especially when the toner particle is erased by a solvent. On the other hand, the toner charged state is slightly unstable. Accordingly, it is preferable to choose an appropriate polymer filler and manufacturing process by taking account of the toner structure.

For example, when the simplest structures containing a color former, developer, matrix agent, and polymer filler shown in FIGS. 5A to 5G are used, the amount of electron donating groups in the polymer filler and the compatibility with an erase solvent are taken into consideration. Generally, the smaller the amount of electron donating groups in the polymer filler, the higher the reflection density of an image formed by the image forming material. On the other hand, the higher the compatibility of the polymer filler with an erase solvent, the lower the reflection density of a paper sheet after solvent erasure.

Practical structures of the second to fourth inventions will be described below with reference to FIGS. 6A to 6F by taking a thermal transfer ribbon as an example. In FIGS. 6A to 6F, the same reference symbols as in FIGS. 5A to 5X are used. As shown in FIGS. 6A to 6F, each thermal transfer ink ribbon is manufactured by forming a back coat film 12 on the back side of a base film 11, and the surface of this base film 11 is coated with an ink film 13. An appropriate ink film thickness is determined by taking account of the image density and the thermal transfer characteristics. However, this ink film thickness is generally 0.5 to 20 $\mu$m, more preferably 2 to 8 $\mu$m.

Figure 6A:
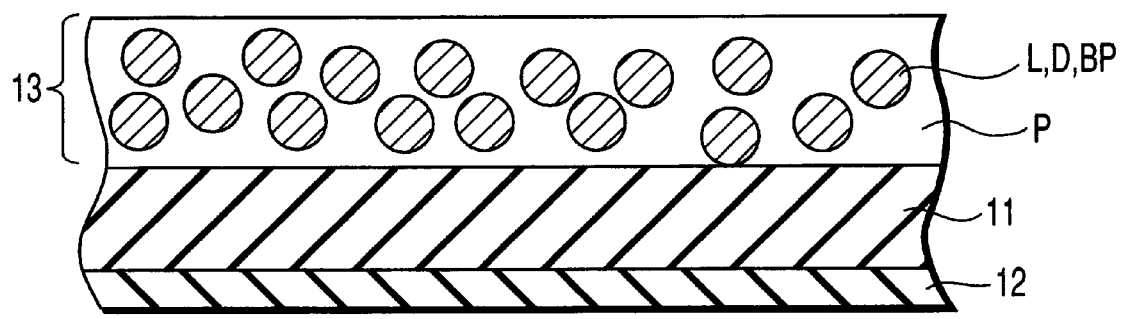
FIGS. 6A to 6F are sectional views showing thermal transfer ink ribbons according to the present invention.
Figure 6B:
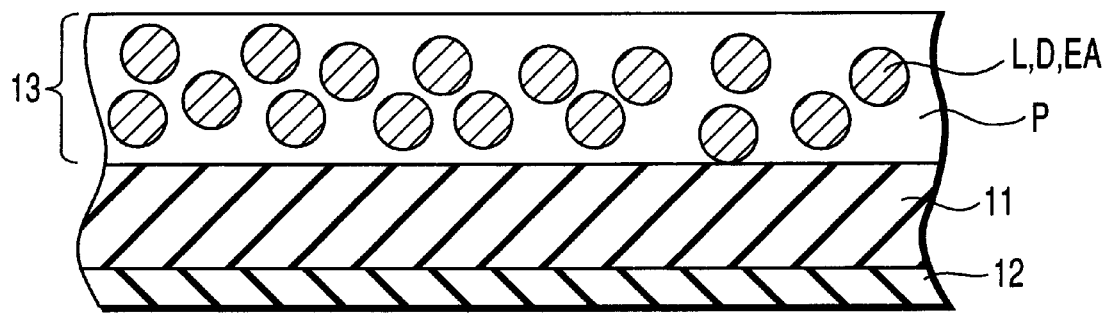
Figure 6C:
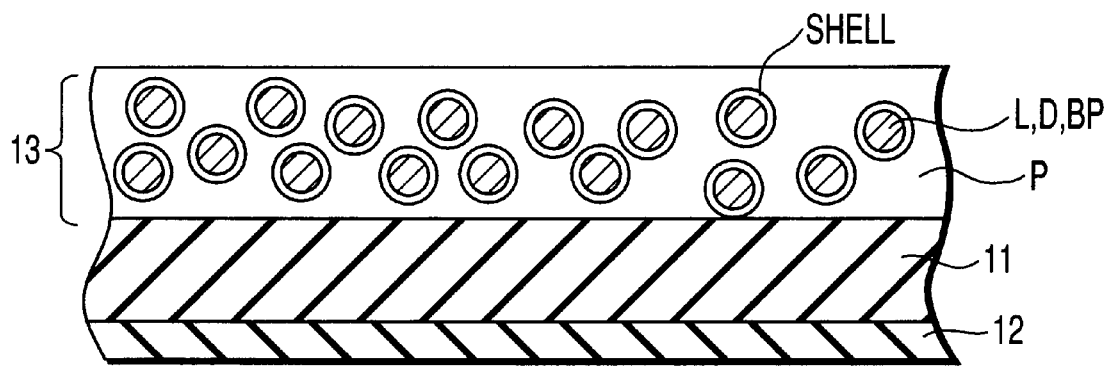
Figure 6D:
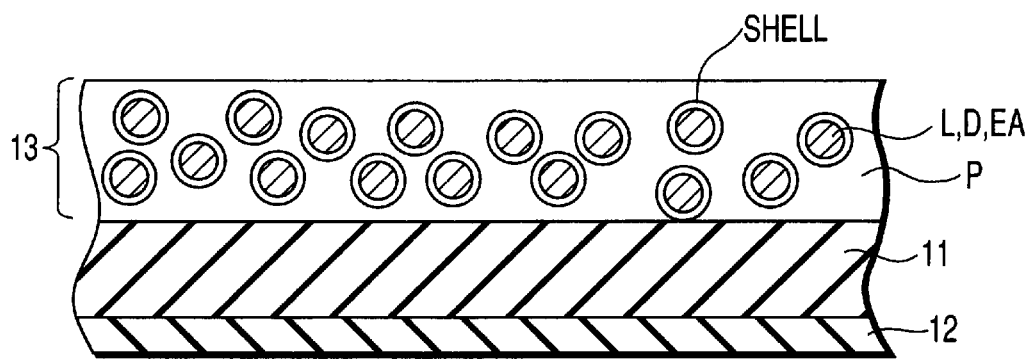
Figure 6E:
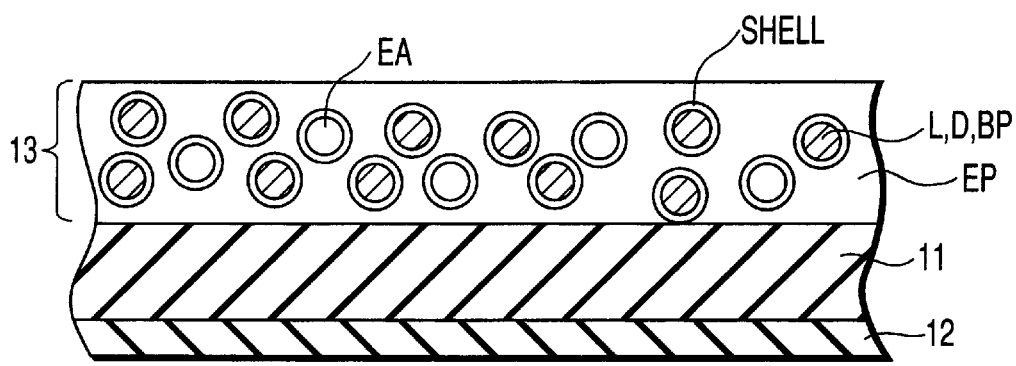
Figure 6F:
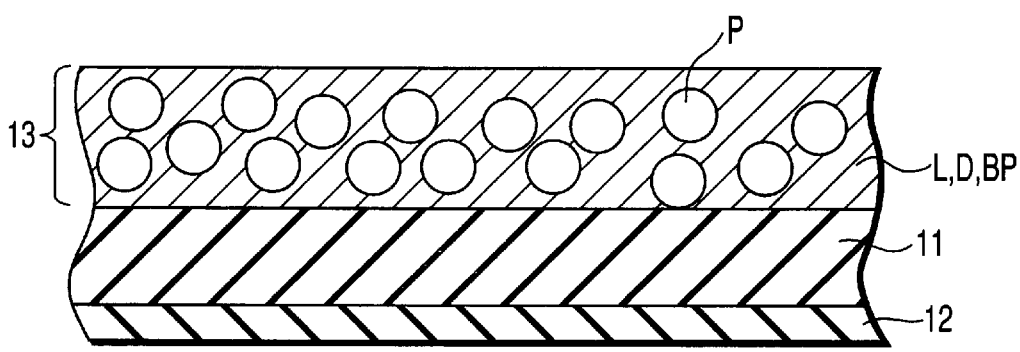

The ink film shown in FIG. 6A has a structure in which cores containing a color former, developer, and matrix agent are dispersed in a polymer filler. The ink film shown in FIG. 6B has a structure in which cores containing a color former, developer, and decolorizer are dispersed in a polymer filler. The ink film shown in FIG. 6C has a structure in which microcapsules each composed of a core containing a color former, developer, and matrix agent (binder resin) and a shell covering this core are dispersed in a polymer filler. The ink film shown in FIG. 6D has a structure in which microcapsules each composed of a core containing a color former, developer, and decolorizer and a shell covering this core are dispersed in a polymer filler. The ink film shown in FIG. 6E has a structure in which microcapsules each composed of a core containing a color former, developer, and matrix agent and a shell covering this core and microcapsules each composed of a core containing a decolorizer and a shell covering this core are dispersed in a polymer filler. The ink film shown in FIG. 6F has a phase-separated structure in which a color former, developer, and matrix agent are evenly dispersed and a polymer filler having a Tg higher by 20° C. or more than that of the matrix agent is pigment-dispersed.

A case where the second to fourth image forming materials are applied to liquid ink will be described below. If in liquid ink the dye components are added as they are formed into a microcapsule using a shell not influenced by an ink solvent (e.g., a gelatin shell with respect to a non-aqueous organic solvent), the material of the polymer filler is not much restricted. On the other hand, if in liquid ink the dye components are added as they are dispersed, without any shells, in a binder insoluble in a solvent, it is advantageous to use an organic solvent having low polarity as an ink solvent in order to prevent a reduction in the image density. In this case, a material that dissolves in a low-polarity solvent is preferably used as a polymer filler.

The image forming materials of the fifth to eighth inventions will be described below.

The fifth to seventh image forming materials form a colorless image on a paper sheet and are used by a method by which each material colors under a first heating condition or a first pressing condition or by a contact of a first solvent and decolors under a second heating condition or a second pressing condition or by a contact of a second solvent. A paper sheet finally set in a stable or metastable decolored state can be reused.

The eighth image forming material forms a colored image on a paper sheet and is used by a method by which the material decolors under a first heating condition or a first pressing condition or by a contact of a first solvent, colors under a second heating condition or a second pressing condition or by a contact of a second solvent, and decolors under a third heating condition or a third pressing condition or by a contact of a third solvent. A paper sheet finally set in a stable or metastable decolored state can be reused.

When these image forming materials are used, information security can be held by, e.g., recording only confidential information in decolored state and coloring this confidential information later.

The image forming materials of the fifth to eighth inventions will be described below by taking liquid ink as an example.

The fifth erasable image forming material contains a color former, a developer, a decolorizer, a matrix agent in which the total number of electron donating groups is 5% or less of the total number of carbon atoms, and an organic solvent having a boiling point of 150° C. or more. The organic solvent used in the fifth invention has a boiling point of 150° C. or more, preferably 180° C. or more. This organic solvent preferably has one or less electron donating group. Examples of this electron donating group are a hydroxyl group, ether group, acyl group, carboxyl group, and ester group. The matrix agent used in the fifth invention is a nonpolar wax or a resin (polymer or oligomer) which is nonpolar or in which the content of a polar group is low.

This image forming material is transferred onto a paper sheet by, e.g., ink jet recording, and the ink solvent is vaporized. At this time, the organic solvent (having retarded vaporization property) that has a high boiling point and hardly vaporizes remains in the image forming material. Therefore, the material is colorless because the interaction between the color former and the developer is inhibited (latent image formation). Although the time during which this state can be maintained depends on the vaporization rate of the high-boiling organic solvent, this time is sufficiently long at room temperature. Next, the high-boiling organic solvent is removed by heating under the first condition, or the image forming material is brought into contact with a solvent capable of removing the high-boiling organic solvent. Consequently, the image forming material colors within a short time period and becomes visually recognizable (development). When the image forming material is further heated under the second condition or brought into contact with an erase solvent, the decolorizer and the developer dissolve each other to make the image forming material lose its color and visually unrecognizable (erasure). The erased image forming material does not redevelop color even under the development condition, so the paper sheet can be reused. Note that when development and erasure are performed by heating, the temperature of the second heating condition is generally higher than that of the first heating condition.

The fifth image forming material can be manufactured by a simple process. However, the initial decolored state is maintained because the high-boiling organic solvent does not vaporize, so this state is readily influenced by temperature and very unstable. Accordingly, the application of the fifth image forming material is preferably limited to liquid ink (of, e.g., a writing tool or ink jet recording) by which a latent image can be formed by a non-heating process.

The erasable image forming material of the sixth invention contains microcapsules containing a color former, a developer, and an organic solvent having an electron donating group, a decolorizer, and a matrix agent in which the total number of electron donating groups is 5% or less of the total number of carbon atoms. The organic solvent used in the sixth invention need only have at least one electron donating group and preferably has high vaporization rate in contrast to the organic solvent used in the sixth invention. As in the fifth invention, the matrix agent used in the sixth invention is a nonpolar wax or a resin (polymer or oligomer) which is nonpolar or in which the content of a polar group is low. In the fifth invention, a polar wax or polar resin (polymer or oligomer) having a small acid value can be suitably used from the viewpoint of the erased state and the adhesion strength of the image forming material.

When this image forming material is formed on a paper sheet, the organic solvent remains in the microcapsules contained in the image forming material. Therefore, the image forming material is colorless because the interaction between the color former and the developer is inhibited (latent image formation). When the image forming material is heated or pressed under the first condition or brought into contact with a solvent capable of destroying the microcapsules, the microcapsules are destroyed, and the organic solvent rapidly vaporizes. Consequently, the image forming material colors within a short time period to make an image visually recognizable (development). When the image forming material is further heated under the second condition or brought into contact with an erase solvent, the decolorizer and the developer dissolve each other to make the image forming material lose its color and visually unrecognizable (erasure). Hence, the paper sheet can be reused.

The seventh erasable image forming material of the present invention contains microcapsules containing a color former, microcapsules containing a developer, a matrix agent in which the total number of electron donating groups is 5% or less of the total number of carbon atoms, and a decolorizer.

When this image forming material is formed on a paper sheet, the image forming material is colorless because the microcapsulated color former and developer are separated in the image forming material (latent image formation). When the image forming material is heated or pressed under the first condition or brought into contact with a solvent capable of destroying the microcapsules, the microcapsules are destroyed, and the developer and color former contained in the microcapsules interact with each other. Consequently, the image forming material colors within a short time period to make an image visually recognizable (development). When the image forming material is further heated under the second condition or brought into contact with an erase solvent, the decolorizer and the developer dissolve each other to make the image forming material lose its color and visually unrecognizable (erasure). Hence, the paper sheet can be reused.

The eighth erasable image forming material of the present invention contains a color former, a developer, a reversible decolorizer, a compatible decolorizer or a phase separation inhibitor, and a matrix agent in which the total number of electron donating groups is 5% or less of the total number of carbon atoms. The reversible decolorizer used in the eighth invention is a material that greatly changes its compatibility with the developer in accordance with its crystallinity (crystalline or amorphous) and can reversibly switch the colored and decolored states of the image forming material when this crystallinity is controlled. The compatible decolorizer is a material that has a high affinity for and therefore very high compatibility with the developer in molten state and hardly causes phase separation even after the composition system has solidified because this decolorizer is highly amorphous. The phase separation inhibitor is also a material that remarkably delays phase separation between the developer and the decolorizer after solidification. In this sense, the compatible decolorizer or the phase separation inhibitor is an irreversible decolorizer. In the eighth invention, the compatible decolorizer or the phase separation inhibitor is preferably dispersed in a phase-separated structure or a microcapsule structure.

When this image forming material is formed on a paper sheet, the image forming material is in colored state because the color former and the developer interact with each other in the material (transfer). When the image forming material is heated to a temperature exceeding the melting point of the reversible decolorizer under the first condition, the reversible decolorizer dissolves and incorporates the developer to make the image forming material colorless (latent image formation). When the image forming material is heated under the second condition, the latent image redevelops color and becomes visually recognizable (development). The image forming material is further heated or pressed under the third condition or brought into contact with a solvent capable of destroying the microcapsules. Consequently, the compatible decolorizer or the phase separation inhibitor and the developer dissolve each other to make the image forming material lose its color and visually unrecognizable (erasure). This allows the paper sheet to be reused.

Figure 7A:
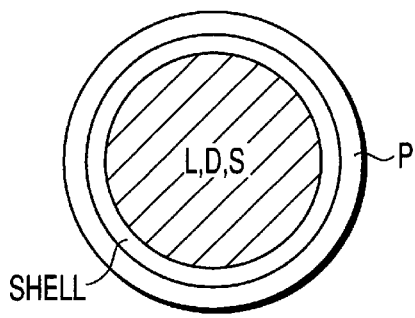
FIGS. 7A to 7N are sectional views showing toner particles according to the present invention.
Figure 7B:
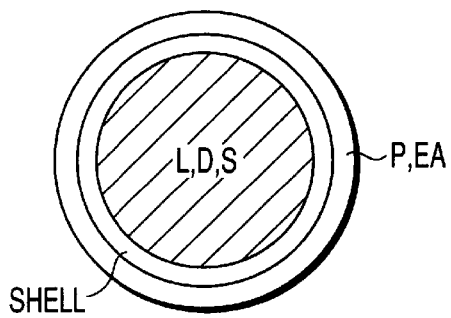

Practical structures of the fifth to eighth image forming materials of the present invention will be described below with reference to FIGS. 7A to 7N by taking a toner particle as an example. In FIGS. 7A to 7N, reference symbol L denotes a color former; D, a developer; S, a polar organic solvent; EA, a decolorizer or erasing agent (compatible decolorizer or phase separation inhibitor); RE, a reversible decolorizer; P, a polymer filler; and BP, a matrix agent (binder resin or wax component).

The toner particle shown in FIG. 7A has a structure in which a microcapsule composed of a core containing a color former, developer, and polar organic solvent and a shell covering this core is covered with a polymer filler. The toner particle shown in FIG. 7B has the same structure as in FIG. 7A except that a decolorizer is dispersed in a polymer filler covering a microcapsule.

Figure 7C:
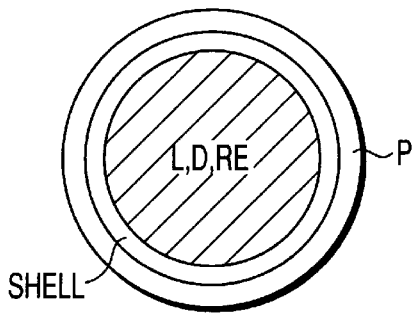
Figure 7D:
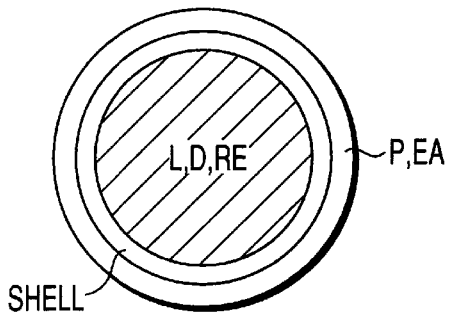

The toner particle shown in FIG. 7C has a structure in which a microcapsule composed of a core containing a color former, developer, and reversible decolorizer and a shell covering this core is covered with a polymer filler. The toner particle shown in FIG. 7D has the same structure as in FIG. 7C except that a decolorizer is dispersed in a polymer filler covering a microcapsule.

Figure 7E:
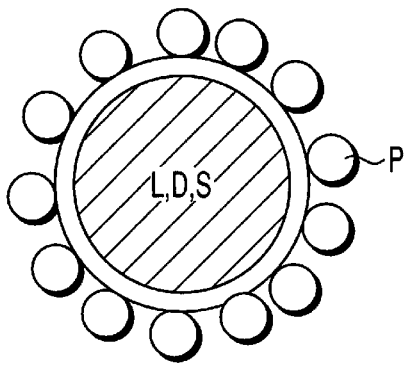
Figure 7F:
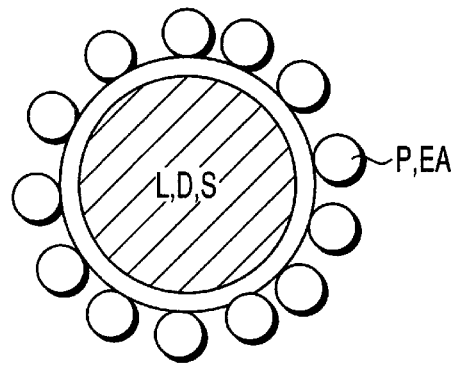

The toner particle shown in FIG. 7E has a structure in which a powder of a polymer filler is externally added by adhering the powder to the outer surface of a microcapsule (similar to the core shown in FIG. 7A) composed of a core containing a color former, developer, and polar organic solvent and a shell covering this core. The toner particle shown in FIG. 7F has the same structure as in FIG. 7E except that a decolorizer is dispersed in a polymer filler externally added to the outer surface of a microcapsule core.

Figure 7G:
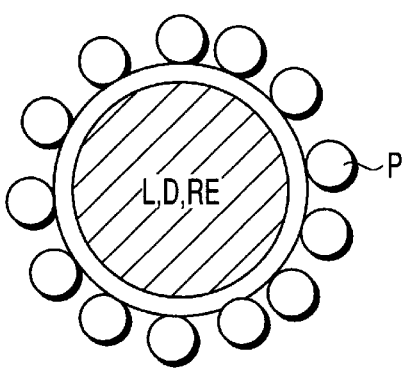
Figure 7H:
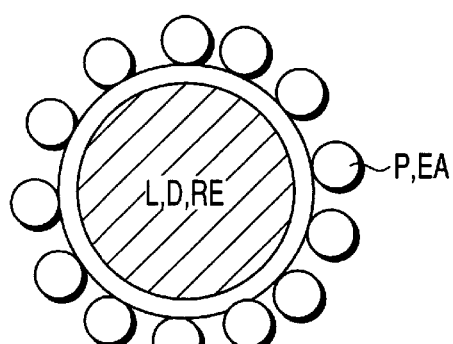

The toner particle shown in FIG. 7G has a structure in which a powder of a polymer filler is externally added by adhering the powder to the outer surface of a microcapsule (similar to the core shown in FIG. 7C) composed of a core containing a color former, developer, and reversible decolorizer and a shell covering this core. The toner particle shown in FIG. 7H has the same structure as in FIG. 7G except that a decolorizer is dispersed in a polymer filler externally added to the outer surface of a microcapsule core.

Figure 7I:
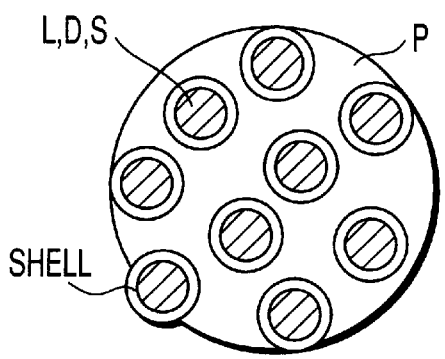
Figure 7J:
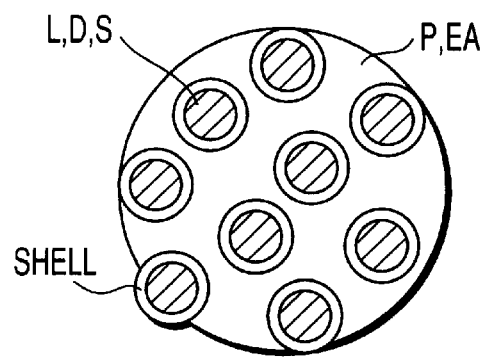

The toner particle shown in FIG. 7I has a structure in which a plurality of microcapsules each composed of a core containing a color former, developer, and polar organic solvent and a shell covering this core are phase-separated in a polymer filler. The toner particle shown in FIG. 7J has the same structure as in FIG. 7I except that a decolorizer is dispersed in a polymer filler containing microcapsule cores.

Figure 7K:
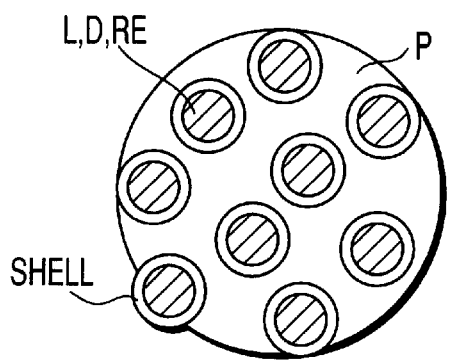
Figure 7L:
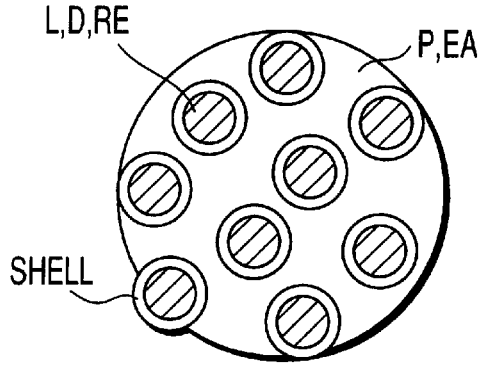

The toner particle shown in FIG. 7K has a structure in which a plurality of microcapsules each composed of a core containing a color former, developer, and reversible decolorizer and a shell covering this core are phase-separated in a polymer filler. The toner particle shown in FIG. 7L has the same structure as in FIG. 7K except that a decolorizer is dispersed in a polymer filler containing microcapsule cores.

Figure 7M:
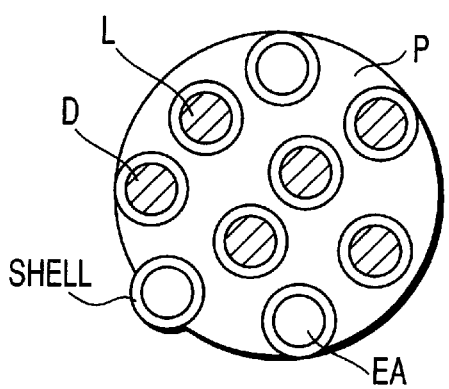
Figure 7N:
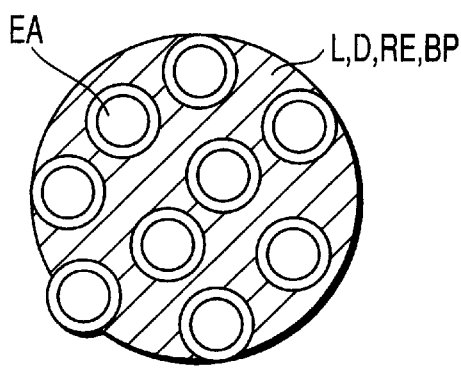

The toner particle shown in FIG. 7M has a structure in which microcapsules each composed of a core containing a color former and a shell covering this core, microcapsules each composed of a core containing a developer and a shell covering this core, and microcapsules each composed of a core containing a decolorizer and a shell covering this core are dispersed in a polymer filler.

The toner particle shown in FIG. 7N has a structure in which a plurality of microcapsules each composed of a core containing a decolorizer and a shell covering this core, a color former, a developer, and a reversible decolorizer are dispersed in a matrix agent.

To apply the fifth to eighth image forming materials to a thermal transfer ink ribbon, it is only necessary to coat the surface of a base film with an ink film such that a structure similar to any of those shown in FIGS. 7A to 7N is obtained.

A supplementary explanation of the components constructing the image forming material of the present invention and an explanation of components not yet explained will be described below.

When an image is to be formed on a paper sheet (image recording medium) containing cellulose as its main component, it is preferable to use a carboxylic acid-based developer, a phenolic developer having a carboxyl group, or a phenolic developer having a sugar skeleton (spirostan structure). Examples of the carboxylic acid-based developer are succinic acid, tartaric acid, malic acid, racemic malic acid, maleic acid, fumaric acid, citric acid, aconitic acid, and itaconic acid. Examples of the phenolic developer having a carboxyl group are 1-hydroxy benzoic acid, 2-hydroxy benzoic acid, 2,3-dihydroxy benzoic acid, and gallic acid. An example of the phenolic developer having a sugar skeleton is an ester of a phenolic developer having a carboxyl group and sugar (e.g., D-glucose, D-mannose, D-galactose, or D-fructose), such as gallic acid-D-glucose monoester. The developer having a carboxyl group interacts with a hydroxyl group of cellulose constructing paper in the form of a hydrogen bond or ester bond and is thereby confined in the paper fibers. The phenolic developer having a sugar skeleton is confined in the paper fibers by adhesion or adsorption resulting from the structural similarity to a cellulose skeleton.

In the second to eighth inventions, a low-molecular decolorizer alone can be used. This low-molecular decolorizer is a material that is compatible with the developer and makes desorption of the incorporated developer difficult by steric hindrance or by the interaction of a hydrogen bond. The decolorizer desirably has good colorlessness in an amorphous state. If the decolorizer is more colorless and transparent in the amorphous state, a paper sheet turns white closer to the original paper sheet when the image forming material on the paper sheet is decolored. To show such characteristics the decolorizer should preferably have a high molecular weight and a small enthalpy change of melting $\Delta H$ of the crystal per weight and, thus, should be low in maximum crystallization velocity (MCV). If the crystal of decolorizer has a small enthalpy change of melting $\Delta H$, the heat energy required for melting the crystal is decreased, which is desirable in regard to energy saving. In order to increase solubility of the developer in the decolorizer, it is desirable that the decolorizer have a high affinity with the developer. Therefore, the decolorizer should desirably be a compound having, for example, an alcoholic hydroxyl group. From the viewpoint of storage stability of the composition system in a decolored state, the glass transition point Tg of the composition system should be not lower than room temperature (25° C.), and preferably be not lower than 50° C. In order to satisfy the above condition, the glass transition point Tg of the decolorizer should also be not lower than room temperature (25° C.), and preferably be not lower than 50° C. On the other hand, the crystallization temperature of a decolorizer is in the range of the glass transition point Tg to the melting point Tm of the composition system. Therefore, in order to accelerate decoloring, the glass transition point Tg of a decolorizer should preferably be not higher than 150° C. As a preferable decolorizer that satisfies above conditions, the following compounds classified in groups (a) to (c) are enumerated.

(a) Sterol compounds: Specific examples are choresterol, stigmasterol, pregnenolone, methylandrostenediol, estradiol benzoate, epiandrostene, stenolone, β-sitosterol, pregnenolone acetate, β-chorestanol, 5,16-pregnadiene-3β-ol-20-one, 5α-pregnen-3β-ol-20-one, 5-pregnen-3β, 17-diol-20-one 21-acetate, 5-pregnen-3β, 17-diol-20-one 17-acetate, 5-pregnen-3β, 21-diol-20-one 21-acetate, 5-pregnen-3β, 17-diol diacetate, rockogenin, thigogenin, esmiragenin, heckogenin, diosgenin, and their derivatives. These decolorizers can be used singly or in the form of a mixture of two or more species. A material such as lanolin alcohol that is originally a mixture can also be used.

When a composition system containing a decolorizer of group (a) in an amorphous state is heated to a temperature higher than its glass transition point, the diffusion velocity of a developer rapidly increases and a motion of phase separation between the developer and the decolorizer is accelerated in a direction to return to equilibrium. If the composition system heated to a temperature higher than the crystallizing temperature and lower than the melting point is then slowly cooled down to room temperature, the system reaches a stable phase separated state closer to equilibrium, at which the system returns to a colored state. Therefore, the composition system including the decolorizer of group (a) can repeat reversible changes between colored and decolored states. In this sense, the decolorizer classified in group (a) is referred to as a "reversible decolorizer".

(b) Cholic acid, lithocholic acid, testosterone, cortisone, and their derivatives: Specific examples are cholic acid, methyl cholate, sodium cholate, lithocholic acid, methyl lithocholate, sodium lithocholate, hyodeoxycholic acid, methyl hyodeoxycholate, testosterone, methyltestosterone, 11α-hydroxymethyltestosterone, hydrocortisone, cholesterol methyl carbonate, and α-cholestanol. Among them, compounds having two or more hydroxyl groups are especially preferred.

The decolorizer of group (b), compared to that of group (a), has a stronger affinity to the developer when they melt, in other words, has a very high compatibility thereto. In addition, the decolorizer of group (b) has a higher inclination toward amorphous, and therefore phase separation is hard to occur even after the composition system solidifies. In this sense, the decolorizer classified in group (b) is referred to as a "compatible decolorizer". For this reason, the composition system including a decolorizer of group (b) can maintain a stabler decolored state.

(c) Non-aromatic cyclic compounds of a five-membered or larger ring having one or more hydroxyl groups: Each decolorizer of group (c) should have a melting point of 50° C. or higher. Specific examples are alicyclic monohydric alcohol (e.g., cyclododecanol), alicyclic dihydric alcohol (e.g., 1,4-cyclohexandiol, 1,2-cyclohexandiol, and 1,2-cyclododecandiol), saccharides and their derivatives (e.g., glucose and saccharose), and alcohols having a ring structure (e.g., 1,2:5,6-diisopropylidene-D-mannitol).

The decolorizer of group (c) functions effectively when it is used together with the decolorizer of group (a), although it may be used singly. That is, the decolorizer of group (c) has a strong affinity with the decolorizer of group (a), and therefore phase separation is hard to occur even after the system is solidified. In this sense, the decolorizer of group (c) is referred to as a "phase separation inhibiting decolorizer" or "phase separation inhibitor". The system including the decolorizer of group (c) can also maintain a stabler decolored state.

Decolorizers of group (c), i.e., the phase separation inhibitors, can be further classified into two types:

(c1) A type having a relatively high melting point and a relatively high glass transition point and, thus, likely to become amorphous at room temperature (a highly amorphous phase separation inhibitor).

(c2) A type having a relatively low melting point and a relatively low glass transition point and, thus, unlikely to become amorphous at room temperature with possibility to form microcrystals, but having high compatibility with the developer under a fluidized state (a slightly amorphous phase separation inhibitor).

A very good decolored state can be obtained when both of a highly amorphous phase separation inhibitor and a slightly amorphous phase separation inhibitor are used as decolorizers.

Cyclic sugar alcohols are suitable highly amorphous phase separation inhibitors. Practical examples are D-glucose, D-mannose, D-galactose, D-fructose, L-sorbose, L-rhamnose, L-fucose, D-ribodesose, α-D-glucose-pentaacetate, acetoglucose, diacetone-D-glucose, D-glucuronic acid, D-galacturonic acid, D-glucosamine, D-fructosamine, D-isosaccharic acid, vitamin C, erutorubic acid, trehalose, saccharose, maltose, cellobiose, gentiobiose, lactose, melibiose, raffinose, gentianose, melizitose, stachyose, methyl-α-glucopyranoside, salicin, amygdalin, and euxanthic acid. One or more types of these compounds can be used.

Suitable examples of the slightly amorphous phase separation inhibitor are non-aromatic cyclic compounds, other than cyclic sugar alcohols, of a five-membered or larger ring having a hydroxyl group, and derivatives of cyclic sugar alcohols, the typical examples being terpene alcohols. Practical examples are alicyclic monohydric alcohols such as cyclododecanol, hexahydrosalicylic acid, menthol, isomenthol, neomenthol, neoisomenthol, carbomenthol, α-carbomenthol, piperithol, α-terpineol, β-terpineol, γ-terpineol, 1-p-menthene-4-ol, isopulegol, dihydrocarveol, and carveol; alicyclic polyhydric alcohols such as 1,4-cyclohexanediol, 1,2-cyclohexanediol, phloroglucitol, quercitol, inositol, 1,2-cyclododecane diol, quinic acid, 1,4-terpene, 1,8-terpene, pinol hydrate, and betulin; polycyclic alcohol derivatives such as borneol, isoborneol, adamantanol, norborneol, fenchol, and camphor; and derivatives of cyclic sugar alcohols such as 1,2:5,6-diisopropylidene-D-mannitol. One or more types of these compounds can be used.

Use of a biological compound as a decolorizer is preferable. Examples of sterol compounds are various animal sterins, plant sterins, fungi sterins, and their derivatives. Practical examples of the animal sterins are cholesterol, lanosterol, lanostadial, agnosterol, cholestanol, coprostanol, ostreasterol, actiniasterol, spongosterol, and clionasterol; examples of the bile acid are cholanoic acid, cholic acid, hyodeoxycholic acid, and lithocholic acid; examples of the plant sterins are stegmasterol, α-sitosterol, β-sitosterol, γ-sitosterol, brassicasterol, and vitamin D; and an example of the fungi sterins is ergosterol. Also, saccharides and their derivatives are extensively used for food and have high safety.

Examples of the polymer filler (oligomer or polymer) are polyacrylic acid, polymethacrylic acid, polyhydroxyethylmethacrylate, polyacrylamide, polymethacrylamide, polyphenylene, polyethersulfone, polyetherketone, polysulfone, polyamide, polybenzimidazole, polyphenyleneether, polyphenylenesulfide, polycarbonate, polydivinylbenzene, and melanin resin.

Other examples are a styrene-acrylate copolymer, styrene-acrylic acid copolymer, styrene-methacrylic acid copolymer, and styrene-epoxy modified styrene copolymer in each of which the weight ratio of an electron donating polar monomer is 15 wt % or more. Examples of an acrylate monomer constructing the styrene-acrylate copolymer are n-butylmethacrylate, isobutylmethacrylate, ethylacrylate, n-butylacrylate, methylmethacrylate, glycidylmethacrylate, dimethylaminoethylmethacrylate, diethylaminoethylmethacrylate, diethylaminopropylacrylate, 2-ethylhexylacrylate, butylacrylate-N-(ethoxymethyl)acrylamide, ethyleneglycolmethacrylate, and 4-hexafluorobutylmethacrylate.

Polymer fillers suitable when the image forming material of the present invention is used as toner will be described below. The polymer fillers in the former group can be suitably used for a styrene-acrylate copolymer-based binder resin. Any of the above polymer fillers can be suitably used for a polystyrene or polyester resin binder. When the dye components and the polymer filler need to be phase-separated, a material having a Tg or a softening point higher by 20° C. or more (desirably 50° C. or more) than that of the binder resin is used as a polymer filler.

Polymer fillers suitable when the image forming material of the present invention is used as liquid ink will be described below. When the dye components are formed into microcapsules in liquid ink, the material of the polymer filler is not much restricted. Examples of the polymer filler in this case are a styrene-acrylate copolymer, polyacrylic acid, polymethacrylic acid, polyviphenylacrylate, polyacrylamide, polymethacrylamide, polyvinylester, polyphenylene, polyethersulfone, polyetherketone, polysulfone, polyamide, polybenzimidazole, polyphenyleneether, polyphenylenesulfide, polycarbonate, polydivinylbenzene, and melanin resin. As the polymer filler, it is also possible to use a soft polar resin having a relatively low molecular weight and a relatively low glass transition point. Practical examples are an ethylene-vinyl acetate copolymer, ethylene-ethylacrylate copolymer, ethylene-maleic anhydride copolymer, ethylene-acrylic ester-maleic anhydride copolymer, propylene-vinyl acetate copolymer, propylene-ethylacrylate copolymer, propylene-maleic anhydride copolymer, propylene-acrylic ester-maleic anhydride copolymer, butylene-vinyl acetate copolymer, butylene-butylacrylate copolymer, butylene-maleic anhydride copolymer, and butylene-acrylic ester-maleic anhydride copolymer.

When in liquid ink the dye components are dispersed without any shells in a binder insoluble in a solvent, it is advantageous to use an organic solvent having low polarity as an ink solvent. If this is the case, the polymer filler is preferably a material that dissolves in a low-polarity solvent. Suitable examples are polyvinyl alcohol and its copolymers.

Preferable blending ratios of the color former, developer, and decolorizer in the image forming material of the present invention are as follows. The blending ratio of the developer is preferably 1 to 10 times, and more preferably, 1.1 to 5 times, in molar quantity, that of the color former. If the developer is less than an equal molar quantity, the image forming material does not well develop color by the interaction between the color former and the developer. If the developer exceeds a tenfold molar quantity, the interaction between the color former and the developer is difficult to reduce. The blending ratio of the decolorizer is preferably 1 to 200 parts by weight, and more preferably, 5 to 100 parts by weight with respect to 1 part by weight of the color former. If the decolorizer is less than 1 part by weight, it is difficult to cause the state change between the colored and decolored states of the image forming material. If the decolorizer exceeds 200 parts by weight, the image forming material does not well develop color.

The matrix agent (binder resin or wax component) used in the present invention will be described below. In the following description, the ratio of an electron donating group in the matrix agent is 5% or less even when this is not particularly specified.

A styrene-based copolymer is a suitable example of the toner binder resin. Practical examples of a styrene-based monomer are styrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene, and 3,4-dichlorostyrene. These styrene-based monomers can be used singly or as a combination of two or more species. Examples of a vinyl monomer to be copolymerized are methyl methacrylate, ethyl methacrylate, isobutyl methacrylate, cyclohexyl methacrylate, ethylhexyl methacrylate, lauryl methacrylate, stearyl methacrylate, vinyl acetate, vinyl propionate, methacrylonitrile, dimethyl maleate, diethyl maleate, dimethyl fumarate, dibutyl fumarate, dimethyl itaconate, dibutyl itaconate, methylvinylether, ethylvinylether, n-butylvinylether, and isobutylether. These vinyl monomers can be used singly or as a combination of two or more species.

Practical examples of the binder resin are styrene-n-butylmethacrylate, styrene-isobutylmethacrylate, styrene-ethylacrylate, styrene-n-butylacrylate, styrene-methylmethacrylate, styrene-glycidylmethacrylate, styrene-dimethylaminoethyl-methacrylate, styrene-diethylaminoethylmethacrylate, styrene-diethylaminopropylacrylate, styrene-2-ethylhexylacrylate, styrene-butylacrylate-N-(ethoxymethyl)acrylamide, styrene-ethyleneglycolmethacrylate, styrene-4-hexafluorobutylmethacrylate, a styrene-butadiene copolymer, an acrylonitrile-acryl rubber-styrene terpolymer, an acrylonitrile-styrene-acrylic ester terpolymer, a styrene-acrylonitrile copolymer, an acrylonitrile-chlorinated polystyrene-styrene terpolymer, an acrylonitrile-ethylenevinylacetate-styrene terpolymer, a styrene-p-chlorostyrene copolymer, a styrene-propylene copolymer, styrene-butadiene rubber, a styrene-maleic ester copolymer, and a styrene-maleic anhydride copolymer. The weight ratio of the components such as butadiene, maleic ester, and chloroprene is desirably 10% or less.

A blend of polystyrene and polyacrylate can also be used. In this case, polyacrylate can be a homopolymer or a copolymer. Also, butadiene, maleic ester, or chloroprene can be copolymerized at a ratio of 10% or less with styrene or acrylate.

As the toner binder resin, an epoxy polymer, urine resin, melanin resin, alkyd resin, acrylic resin, polyester, polyamide resin, or polyurethane can be blended. In this case, the ratio of these polymer components is desirably 15 wt % or less.

Polyester is synthesized by the reaction between a carboxylic acid and polyhydric alcohol. Examples of the carboxylic acid monomer are terephthalic acid, fumaric acid, maleic acid, succinic acid, glutaric acid, adipic acid, pimelic acid, suberic acid, azelaic acid, sebacic acid, brassilic acid, pyromellitic acid, citraconic acid, glutaconic acid, mesaconic acid, itaconic acid, teraconic acid, phthalic acid, isophthalic acid, hemimellitic acid, mellophanic acid, trimesic acid, prehnitic acid, trimellitic acid, and their derivatives. Examples of the polyhydric alcohol are ethylene glycol, propylene glycol, butanediol, neopentyldiol, hexamethylenediol, heptanediol, octanediol, pentaglycerol, pentaerythritol, cyclohexanediol, cyclopentanediol, pinacol, glycerin, etherified diphenol, catechol, resorcinol, pyrogallol, benzenetriol, phloroglucinol, benzenetetraol, and their derivatives. These monomers can be used singly or in the form of a mixture of two or more species. It is also possible to blend two or more polyesters.

When polyester is used as the binder resin of toner, the mixing ratio is desirably adjusted in accordance with the average molecular weight as follows:

| Average molecular weight | Mixing ratio |
| --- | --- |
| 1,000 to 5,000 | 30 to 95 wt % |
| 5,000 to 10,000 | 30 to 90 wt % |
| 10,000 to 20,000 | 30 to 87 wt % |
| 20,000 to 100,000 | 30 to 85 wt % |
| 100,000 to 1,000,000 | 30 to 80 wt % |

When an epoxy polymer is used as the binder resin of toner, the mixing ratio is desirably adjusted in accordance with the average molecular weight as follows:

| Average molecular weight | Mixing ratio |
| --- | --- |
| 1,000 to 5,000 | 30 to 95 wt % |
| 5,000 to 10,000 | 30 to 90 wt % |
| 10,000 to 20,000 | 30 to 87 wt % |
| 20,000 to 100,000 | 30 to 85 wt % |
| 100,000 to 1,000,000 | 30 to 80 wt % |

In erasable toner in which the dye components are separated by microcapsules, it is also possible to use, as a binder resin, polyvinyl acetate, polyurethane, epoxy resin, polyvinylbutyral, polyacrylate resin, urine resin, polyamide, rosin, modified rosin, terpene resin, fatty acid or alicyclic hydrocarbon resin, aromatic petroleum resin, chlorinated paraffin, and paraffin wax.

When toner is to be given a microcapsule structure, it is preferable to well disperse the color former, developer, or decolorizer in the core material (binder resin or wax component) by using a masterbatch or the like. As a mixing/dispersing method, it is possible to use wet dispersion which uses a solvent by using a device such as a high-speed dissolver, roll mill, or ball mill, or melt kneading which uses a roll, pressure kneader, internal mixer, or screw extruder. As a mixing means, a ball mill, V-mixer, Forberg, or Henschel mixer can be used.

Microcapsules can be manufactured as follows.

(1) Fine resin particles as shells are adhered to cores and fixed by a mechanochemical method using Hybridizer (Nara Kikai K.K.), Mechanofusion (HOSOKAWA MICRON CORP.), or Cryptron (Kawasaki Heavy Industries Ltd.)

(2) Fine resin particles as shells are adhered to cores and continuously polymerized (in-situ polymerization). Examples of this polymerization are emulsion polymerization, suspension polymerization, soap-free polymerization, seed polymerization, and dispersion polymerization. Emulsion polymerization and suspension polymerization are preferable because a shell material having higher thermal-mechanical strength than that of the core resin can be obtained. However, the use of an acid catalyst as a polymerization catalyst is unpreferable because if the acid catalyst remains it causes regeneration of color after decoloration.

It is also possible to mix the obtained microcapsules in a polymerizable monomer which gives a binder, and add a polymerization initiator to this mixture to cause a polymerization reaction, thereby forming a binder resin. Polymer chains intertwine with each other, and the microcapsules are incorporated between these polymer chains. This method forms toner in which the microcapsules are dispersed in the binder resin.

(3) A binder resin and dye components are added to a solvent to form a solution or slurry. The resultant solution or slurry is sprayed to form fine particles, which are dried. Low-melting wax is often used as a core. This core exists in the form of a solid, gel, or liquid in a shell.

Examples of the microcapsule shell material are polyether sulfone, polyether ketone, epoxy resin, polyethylene, polypropylene, polyphenylene ether, polyphenylene sulfite, polyalkylene oxide, polystyrene, polydivnylbenzene, polyphenol ether, nylon, polyamide, polyurethane, gelatin, polymethacrylic acid, polyimide, melanin resin, polyester, polyacrylic acid, polymethacrylonitrile, polysiloxane, polysulfide, polycarbonate, polysulfone, polyisocyanate, and a styrene-vinyl copolymer. These compounds can be used singly or as a combination of two or more species.

To destroy microcapsules by heating, a material destroyable at 120 to 200° C. is selected. To destroy microcapsules by a solvent, a material destroyable by a polar solvent is selected. Of the aforementioned shell materials, a copolymer of styrene and a vinyl-based monomer superior in transparency and mechanical strength is suitably used. The microcapsule shell desirably has high mechanical strength because it must have resistance to external pressure. However, if this mechanical strength is too high, microcapsule shells cannot be destroyed when pressed in a fixing device. Therefore, a copolymer in which the weight ratio of styrene and the vinyl monomer is 10 to 1:1 is preferable.

Practical examples of the styrene-based monomer are styrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene, and 3,4-dichlorostyrene. These monomers can be used singly or as a combination of two or more species. Examples of the vinyl-based monomer are methyl methacrylate, ethyl methacrylate, isobutyl methacrylate, cyclohexyl methacrylate, ethylhexyl methacrylate, lauryl methacrylate, stearyl methacrylate, vinyl acetate, vinyl propionate, methacrylonitrile, dimethyl maleate, diethyl maleate, dimethyl fumarate, dimethyl itaconate, dibutyl itaconate, methylvinylether, ethylvinylether, n-butylvinylether, and isobutylether. These vinyl-based monomers can be used singly or as a combination of two or more species.

The amount of color former and developer contained in the core of a microcapsule is 30 to 99 wt % (preferably 88 to 98 wt %) in a colored core not containing a decolorizer, 5 to 70 wt % (preferably 10 to 60 wt %) in a colored core containing a decolorizer, and 5 wt % or less (preferably 0 wt %) in a core of a decolorizer.

The shell thickness of a microcapsule ranges between 0.01 and 2 μm. However, a suitable range changes in accordance with the type of erasing method or erase solvent. For example, the shell thickness is preferably 0.01 to 0.3 μm when erasure is performed using a low-solubility alcohol solvent, 0.05 to 0.5 μm when erasure is performed using an ether-based solvent, 0.1 to 1 μm when erasure is performed using a high-solubility ketone-based solvent in order to prevent an unerased image such as a blur caused by a flow of the decolorizer, and 0.5 to 2 μm when a halogen-based solvent having higher solubility than that of a ketone-based solvent is used. A suitable particle size of a microcapsule changes in accordance with the intended use of the image forming material. However, the particle size is preferably 1 to 5 μm for toner, thermal transfer ink, and writing ink, and 100 to 1,000 nm for ink jet printer ink, which is smaller than the nozzle size.

In erasable toner in which the dye components are separated by a phase-separated structure by using a polymer filler and a binder resin, a material that does not decline the toner image density is preferably used as a binder resin. Examples are polystyrene; a styrene-acrylate copolymer, styrene-acrylic acid copolymer, styrene-methacrylic acid copolymer, and styrene-epoxy modified styrene copolymer, in each of which the weight ratio of a polar monomer of the copolymer is 15 wt % or less; and a polyester resin in which the content of a polar group is relatively small. As a polymer filler, a material having a glass transition point or softening point higher by 20° C. or more (desirably 50° C. or more) than that of the binder resin is selected from the above-mentioned materials.

The binder resin of the toner preferably has a softening point of 95 to 160° C. and a glass transition point of 50 to 80° C. The softening point is measured as a temperature ($T_{1/2}$) when the sample flow amount reaches the half value under conditions of nozzle: 1.0 mmφX 10.0 mm, load: 30 kgf, heating rate: 3° C./min, and sample amount: 1.0 g by using a flow tester (CFT-500 manufactured by Shimadzu Corp.) The glass transition point is measured as the temperature of a shoulder value after melt quench by DSC.

When the present invention is applied to toner, a wax component can also be added to control the fixation. Examples of the wax component are long-chain aliphatic alcohol having 10 or more carbon atoms, long-chain aliphatic ketone having 10 or more carbon atoms, low-molecular weight polypropylene, low-molecular weight polyethylene, low-molecular weight polystyrene, low-molecular weight polyalkane, and their modified compounds. These wax components can be used singly or as a combination of two or more species. The weight-average molecular weight of this wax component is preferably $10^2$ to $10^5$, and more preferably, $10^2$ to $10^4$. Note that each of the following wax components has an acid value: aliphatic carboxylic acid wax represented by stearic acid wax, carnauba wax containing fatty acid, rice wax that is an ester of a higher fatty acid and higher alcohol and contains a free carboxylic acid, montan wax that is coal-based synthetic wax and contains polymer wax acid, acid amide, liquid paraffin, sazole wax, caster wax, and chlorinated paraffin. These wax components are saponified with calcium hydroxide to reduce the acid value to 10 or less before being used. The addition amount of the wax component is preferably 0.1 to 30 parts by weight, and more preferably, 0.5 to 15 parts by weight with respect to 100 parts by weight of toner. For a toner to be thermally fixed, 5 parts by weight of the wax are added to impart release characteristics from a fixing roll. In an electrophotographic toner to be fixed by pressure, the main component of the core of a microcapsule structure is the wax.

A charge control agent used in the erasable toner of the present invention can be either a negative charge control agent or a positive charge control agent. Examples of the negative charge control agent are a metal chelate of alkylsalicylic acid, a metal chelate of dicarboxylic acid, chlorinated polyester, acid base-excess polyester, chlorinated polyolefin, a metal salt of fatty acid, and fatty acid soap. Practical examples are E-84 as a zinc salicylate compound manufactured by Orient Kagaku K.K., N-1, N-2, and N-3 as phenol-based compounds manufactured by NIPPON KAYAKU CO. LTD., FCA-1001N as a styrene-sulfonic acid-based resin manufactured by FUJIKURA KASEI CO. LTD., and LR-147 manufactured by Nippon Carret Inc. Examples of the positive charge control agent are quaternary ammonium salts, guanamine derivatives, amine compounds, and nitrogen compounds. Practical examples are TP-302 (CAS#116810-46-9) and TP-415 (CAS#117342-25-2) manufactured by Hodogaya Chemical Co. Ltd., P-51 as a quaternary amine compound manufactured by Orient Kagaku K.K., AFP-B as a polyamine oligomer manufactured by Orient Kagaku K.K., and FCA-201PB as a styrene-acryl quaternary ammonium salt-based resin manufactured by FUJIKURA KASEI CO. LTD. Of these charge control agents, a colorless or transparent charge control agent is used.

The erasable toner of the present invention can also be blended, where necessary, with an external additive to control the flowability, storage stability, blocking resistance, or photosensitive body polishing characteristics. As this external additive, fine silica particles, fine metal oxide particles, a cleaning assistant, and the like are used. Examples of the fine silica particles are silicon dioxide, sodium silicate, zinc silicate, and magnesium silicate. Examples of the fine metal oxide particles are zinc oxide, magnesium oxide, zirconium oxide, strontium titanate, and barium titanate. Examples of the cleaning assistant are fine resin powders of polymethylmethacrylate, polyvinylidene fluoride, and polytetrafluoroethylene. These external additives are preferably subjected to surface processing, e.g., imparted hydrophilic nature. For the negative charge control agents, processing agents such as a silane coupling agent, titanium coupling agent, and silicone oil are used. For the positive charge control agents, processing agents such as an amino silane-based processing agent and silicone oil having amine in a side chain are used. The addition amount of these external additives is preferably 0.05 to 5 parts by weight, and more preferably, 0.1 to 3.0 parts by weight with respect to 100 parts by weight of the toner. Fine silica particles in which the number-average particle size of primary particles is 10 to 20 nm are often used, and particles up to 100 nm are also used. In the case of a material other than silica, particles having a number-average particle size of 0.05 to 3 $\mu$m are used.

The particle size range of the erasable toner is preferably such that the volume-average particle size is 6 to 20 $\mu$m, the content of particles of 5 $\mu$m or less is 2 to 20 number % in the number distribution, the content of particles of 5 $\mu$m or less is 0 to 5 volume% in the volume distribution, and the content of particles of 20 $\mu$m or more is 0 to 5 volume % in the volume distribution. These values are measured with Coulter Multisizer (Coulter Corp.)

The conductivity of the erasable toner is preferably $10^{11}$ to $10^{16}$ $\Omega \cdot$cm, and more preferably, $10^{13}$ to $10^{15}$ $\Omega \cdot$cm. When in dual-component development an iron powder, ferrite, and magnetite are used as carriers and the erasable toner is resin-coated with silicone or acryl, the conductivity is preferably $10^{9}$ $\Omega \cdot$cm or less for an iron powder, about $10^{6}$ to $10^{15}$ $\Omega \cdot$cm for ferrite, and $10^{13}$ $\Omega \cdot$cm or more for magnetite. When a magnetic powder is dispersed in a resin and the dispersion is pulverized to about 50 $\mu$m, the conductivity is preferably $10^{13}$ $\Omega \cdot$cm or more. The conductivity is measured by forming the toner into disk-like tablets 20 mm in diameter and 1 mm in thickness and applying a potential of 1 V0.1 kHz to the tablets.

In the present invention, a good erased state can be stably obtained by adjusting the pH of the image forming material to 7 or more. A basic substance is used to adjust the pH of the image forming material to about 8. This basic substance is not particularly limited and can be an inorganic compound or an organic compound. These basic compounds can be directly added to the image forming material or formed into microcapsules before being added.

Examples of suitable inorganic compounds are calcium chloride, potassium hydroxide, calcium hydroxide, sodium hydroxide, barium hydroxide, magnesium hydroxide, ammonium carbonate, potassium carbonate, calcium carbonate, sodium carbonate, magnesium carbonate, ammonium hydrocarbonate, potassium hydrocarbonate, sodium hydrocarbonate, alkaline metal borates, tripotassium phosphate, dipotassium hydrophosphate, calcium phosphate, trisodium phosphate, and disodium hydrophosphate.

Examples of suitable organic compounds are primary to tertiary amines and quaternary ammonium salts. Examples of the counter ions of the quaternary ammonium salts are a hydroxyl ion, halogen ion, and alkoxide ion.

Examples of the non-aromatic amines or ammonium salts are compounds having aliphatic hydrocarbon group having 1 to 50 carbon atoms or having alicyclic hydrocarbon group having 1 to 50 carbon atoms. These hydrocarbon groups can be substituted by at least one substituent selected from the group consisting of vinyl group, ethynylene group, ethynyl group, oxy group, oxycarbonyl group, thiocarbonyl group, dithiocarbonyl group, thio group, sulfinyl group, sulfonyl group, carbonyl group, hydrazo group, azo group, azido group, nitrilo group, diazoamino group, imino group, urea bond, thiourea bond, amide bond, urethane bond, and carbonyldioxy group.

Examples of the aromatic amines or ammonium salts are those having an aromatic ring such as benzene ring, biphenyl ring, naphthalene ring, tetralone ring, anthracene ring, phenanthrene ring, indene ring, indan ring, pentalene ring, azulene ring, heptalene ring, and fluorene ring. An aliphatic hydrocarbon group having 1 to 50 carbon atoms or an alicyclic hydrocarbon group having 1 to 50 carbon atoms can be substituted in these aromatic rings. Further, the substituents given above can be substituted in these hydrocarbon groups.

Examples of the cyclic amines are aziridine, azetidine, pyrroline, pyrrolidine, indoline, pyridine, piperidine, hydropyridine, quinoline, isoquinoline, tetrahydroquinoline, tetrahydroisoquinoline, acridine, phenanthrizine, phenanthroline, pyrazole, benzimidazole, pyridazine, pyrimidine, pyrazine, imidazole, histamine, decahydroquinoline, pyrazoline, imidazoline, imidazolidine, piperazine, cinnoline, phtharazine, quinazoline, quinoxaline, dihydrophenazine, triazole, benzotriazole, triazine, tetrazole, pentamethylenetetrazole, tetrazine, purine, pteridine, carboline, naphthyridine, indolizine, quinolizine, quinuclidine, oxazole, oxazolidine, benzoxazole, isoxazole, anthranil, oxazine, oxazoline, thiazole, thiazolidine, benzothiazole, benzothiazoline, isothiazole, thiazine, azoxime, furazane, oxadiazine, thiadiazole, benzothidiazole, thiadiazine, dithiazine, morpholine, hexamethylenetetramine, and diazabicycloundecene.

Examples of usable organic basic compounds other than those enumerated above are alkali metal salts of alcohols, alkali earth metal salts of alcohols, amidine, guanidine, aminoguanidine, urea, thiourea, semicarbazide, thiosemicarbazide, and carbonohydrazide.

When the present invention is applied to liquid ink, nonpolar wax for a nonpolar or low-polarity resin (polymer or oligomer) can be suitably used as a matrix agent. Examples of the nonpolar wax are higher alcohols (e.g., 1-docosanol, 1-eicosanol, and stearyl alcohol), higher ketones (e.g., stearone and 14-heptacosanone), and higher aliphatic esters (e.g., stearyl alcohol laurate and docosanol stearate). The acid value is preferably 10 or less. The weight-average molecular weight of the wax is preferably $10^2$ to $10^5$, and more preferably, $10^2$ to $10^4$. Examples of the nonpolar or low-polarity resin are low-molecular weight polypropylene, low-molecular weight polyethylene, low-molecular weight polybutylene, low-molecular weight polyalkane, and low-molecular polystyrene.

A nonpolar or low-polarity organic solvent is suitable for an organic solvent having a boiling point of 150° C. or more (desirably 180° C. or more) used in the fifth image forming material of the present invention. Examples of the nonpolar organic solvent are long-chain saturated aliphatic hydrocarbons (e.g., dodecane, tetradecane, hexadecane, octadecane, eicosane, docosane, tetracosane, and liquid paraffin), long-chain unsaturated aliphatic hydrocarbons (e.g., dodecene, tetradecene, hexadecene, octadecene, eicocene, dococene, and tetracocene), alicyclic hydrocarbons (e.g., cycloheptane and cyclooctane), chain terpenes (e.g., myrcene and ocimene), and cyclic terpenes (e.g., menthene, limonene, terpinolene, and terpinene). Examples of the low-polarity organic solvent are alkylalkanols (e.g., 2-butyloctanol, 2-butyldecanol, 2-hexyldecanol, 2-octyldecanol, and 2-decyldodecanol), long-chain aliphatic alcohols (e.g., octanol and decanol), alicyclic alcohols (e.g., cyclohexanol), polyhydric alcohols (e.g., ethyleneglycol, propyleneglycol, burleneglycol, glycerin, and pentaglycerol), and long-chain aliphatic esters (e.g., ethyl decanoate, ethyl laurate, butyl laurate, and butyl lactate).

An organic solvent used in the sixth image forming material of the present invention need only have at least one electron donating group. Also, since color changes are fast, an organic solvent having high vaporization rate, contrary to the organic solvent used in the fifth invention, is preferable. This organic solvent can be selected from wide variations of solvents from solvents having relatively low polarity, such as alcohols (e.g., ethanol and isopropyl alcohol) and aliphatic esters (e.g., methyl acetate and methyl butyrate) to solvents having relatively high polarity, such as acetone, methylethylketone, cyclohexane, diethoxymethane, and dimetylformamide.

The polymer filler as described earlier is used in liquid ink. The content of this polymer filler in liquid ink changes in accordance with the intended use of the ink. The content is desirably 0.5 to 10 wt % for ink jet ink, 3 to 20 wt % for writing ink, 5 to 30 wt % for offset ink, and 20 to 60 wt % for viscous ink.

In a thermal transfer ink ribbon, a soft resin having a relatively low molecular weight and a low glass transition point is suitably used as a binder resin when the thermal transfer characteristics of the resin composition are taken into consideration. Practical examples are polyethylene, polypropylene, an ethylene-vinyl acetate copolymer, ethylene-ethylacrylate copolymer, ethylene-maleic anhydride copolymer, ethylene-acrylic ester-maleic anhydride copolymer, propylene-vinyl acetate copolymer, propylene-ethylacrylate copolymer, propylene-maleic anhydride copolymer, propylene-acrylic ester-maleic anhydride copolymer, butylene-vinyl acetate copolymer, butylene-butylacrylate copolymer, butylene-maleic anhydride copolymer, and butylene-acrylic ester-maleic anhydride copolymer. It is also possible to use a styrene-acrylate copolymer having a relatively low molecular weight or a polyester-based resin having a relatively low molecular weight and a low glass transition point. As a polymer filler, resins having a larger amount of polar groups than in the binder resin can be suitably used, except the polyolefin-based resins among other resins enumerated above.

In the present invention, an image recording medium is also allowed to function as a polymer filler. That is, when the image forming material is heated or brought into contact with a solvent, one of the color former and the developer interacts with an image recording medium (by adhesion, adsorption, or bonding) to achieve at least a part of the erasing function. This image forming material preferably contains a color former and a developer, and more preferably contains a decolorizer. Consequently, it is possible to reduce the absolute amount of the decolorizer, increase the matrix agent in the image forming material, and raise the dispersibility of the components.

In the present invention, a colored image forming material is erased using a method of erasing the image forming material by heating and melting the material or a method of erasing the image forming material by bringing the material into contact with a solvent.

As heat erasing devices applicable when an image forming material containing a decolorizer is erased by heat, it is possible to apply various heating devices such as a hot stamp, heat roller, heat gun, fan heater, heat lamp, and a large plant combining these devices, in addition to a thermal printer head (TPH) capable of rapid cooling, laser beam head, and thermal bar.

In the method of bringing the image forming material into contact with a solvent, a paper sheet is dipped in the solvent, or the solvent is sprayed onto a paper sheet. Examples of means of this method are a roller for dipping a paper sheet in the solvent contained in a vessel, a spray nozzle for spraying the solvent onto a paper sheet, a nozzle for dropping the solvent onto a paper sheet, and a gravure roller for supplying the solvent to a paper sheet.

To obtain a good erased state after solvent erasure, it is effective to further heat to the melting point of the decolorizer or higher. That is, unerased images on an image recording medium are reduced by heating, so a high-quality erased state can be obtained. At the same time, the solvent remaining on the image recording medium can be removed. Examples of the heating means are hot air, an infrared lamp, a heat roller, a hot press, a thermal printer head (TPH), and a thermal bar. These devices preferably have a means for collecting the solvent used.

Figure 8A:
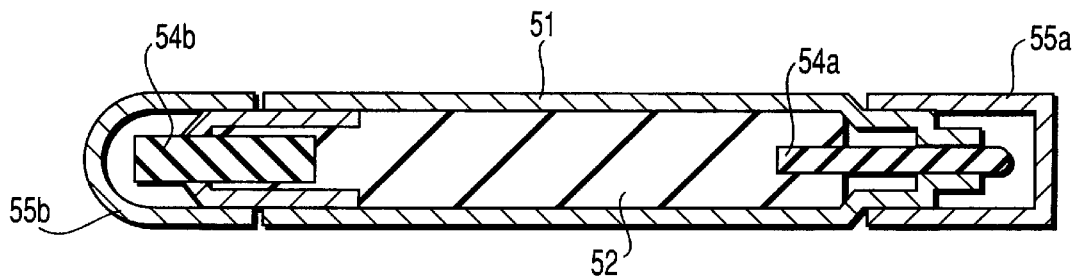
FIGS. 8A and 8B are sectional views showing an erase pen and a write/erase pen used in the present invention.
Figure 8B:
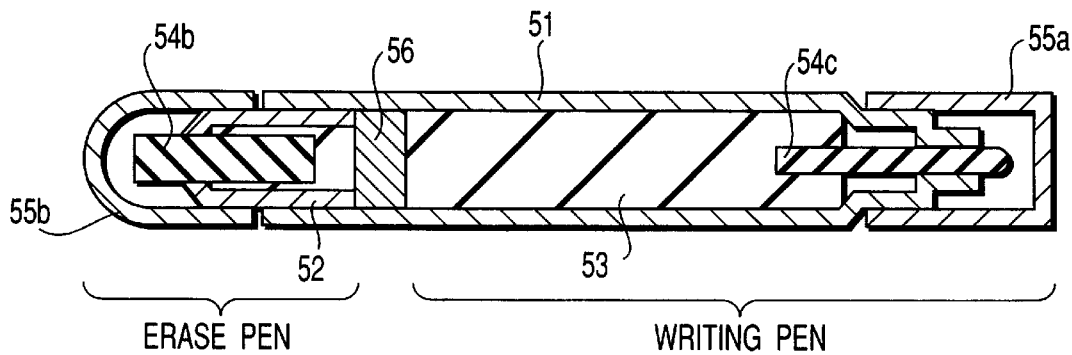

As shown in FIGS. 8A and 8B, erasure or writing/erasure can be performed using a pen-style writing tool. FIG. 8A shows the structure of a correction (erase) pen. FIG. 8B shows the structure of a write/erase pen.

In the correction (erase) pen shown in FIG. 8A, an erasing solution 52 is contained in a pen main body 51. Two felt-tips 54a and 54b for detail correction and normal correction having different thicknesses are inserted into the pen main body 51. Caps 55a and 55b for preventing drying are attached to these felt-tips 54a and 54b, respectively.

In the write/erase pen shown in FIG. 8B, erasable ink 53 and an erase solution 52 are separated by a partition 56 in a pen main body 51 to prevent mixture of these materials. A write felt-tip 54c and a correction felt-tip 54d are inserted into the pen main body 51. Caps 55a and 55b for preventing drying are attached to these felt-tips 54c and 54d.

The correction (erase) pen can erase toner, liquid ink, and solid ink (e.g., ink ribbons, color pencils, and crayon) manufactured by using the image forming materials of the present invention. Also, only a certain kind of ink can be erased in accordance with the selection of the erase solution.

It is desirable for the solvent used in this solvent erasing method to satisfy requirements (A) and (B) given below:

(A) The solvent should desirably be effective for assisting the formation of hydrogen bonds between the developer and the decolorizer.

(B) The solvent should desirably exhibit a high affinity with the binder so as to permeate deep inside the image forming material.

The solvent satisfying requirement A given above can be used singly. Also, it is possible to use a plurality of solvents in combination to allow the mixed solvents to satisfy requirements A and B.

Examples of the solvents satisfying both requirements (A) and (B) are ethers, ketones, and esters. Practical examples are saturated ethers such as ethyl ether, ethyl propyl ether, ethyl isopropyl ether, isopentyl methyl ether, butyl ethyl ether, dipropyl ether, diisopropyl ether, ethyl isopropyl ether, dibutyl ether, dipentyl ether, diisopentyl ether, and dihexyl ether; unsaturated ethers such as ethyl vinyl ether, allyl ethyl ether, diallyl ether, and ethyl propargyl ether; ethers of dihydric alcohols such as 2-methoxyethanol, 2-ethoxyethanol, 2-butoxyethanol, 1,2-dimethoxyethane, 1,2-diethoxyethane, and 1,2-dibutoxyethane; cyclic ethers such as oxetane, tetrahydrofuran, tetrahydropyran, dioxolane, dioxane, and trioxane; saturated ketones such as acetone, methyl ethyl ketone, methyl propyl ketone, diethyl ketone, isopropyl methyl ketone, butyl methyl ketone, ethyl propyl ketone, isobutyl methyl ketone, pinacolone, methyl pentyl ketone, butyl ethyl ketone, dipropyl ketone, diisopropyl ketone, hexyl methyl ketone, isohexyl methyl ketone, heptyl methyl ketone, and dibutyl ketone; unsaturated ketones such as ethylidene acetone, allyl acetone, and mesityl oxide; cyclic ketones such as cyclopentanone, cyclohexanone, cycloheptanone, and cyclooctanone; and esters such as ethyl formate, propyl formate, butyl formate, isobutyl formate, pentyl formate, isopentyl formate, ethyl acetate, isopropyl acetate, propyl acetate, butyl acetate, isobutyl acetate, pentyl acetate, isopentyl acetate, sec-amyl acetate, hexyl acetate, allyl acetate, 2-methoxyethyl acetate, 2-ethoxyethyl acetate, 1,2-diacetoxy ethane, methyl propionate, ethyl propionate, propyl propionate, isopropyl propionate, butyl propionate, pentyl propionate, isopentyl propionate, sec-amyl propionate, 2-methoxypropyl acetate, 2-ethoxypropyl acetate, methyl butyrate, ethyl butyrate, propyl butyrate, isopropyl butyrate, butyl butyrate, pentyl butyrate, isopentyl butyrate, sec-amyl butyrate, methyl isobutyrate, ethyl isobutyrate, propyl isobutyrate, isopropyl isobutyrate, butyl isobutyrate, pentyl isobutyrate, isopentyl isobutyrate, sec-amyl isobutyrate, methyl valerate, ethyl valerate, propyl valerate, isopropyl valerate, butyl valerate, methyl hexanoate, ethyl hexanoate, propyl hexanoate, and isopropyl hexanoate. Examples of additional solvents are methylene chloride, γ-butyrolactone, β-propiolactone, n-methylpyrrolidinone, dimethyl formamide, dimethyl acetamide, and dimethyl sulfoxide (the first group). These solvents can be used singly or in the form of a mixture of two or more compounds. In the case of using mixed solvents, the mixing ratio can be determined arbitrarily.

Examples of the solvents satisfying requirement A, though the affinity with the binder is low, are water, methyl alcohol, ethyl alcohol, propyl alcohol, isopropyl alcohol, butyl alcohol, isobutyl alcohol, pentyl alcohol, 2-pentyl alcohol, 3-pentyl alcohol, isopentyl alcohol, 1-hexanol, 2-hexanol, 3-hexanol, cyclopentanol, cyclohexanol, ethylene glycol, propylene glycol, butylene glycol, and glycerin (the second group).

On the other hand, examples of the solvents having a high affinity with the binder but failing to satisfy requirement A are toluene, ethylbenzene, propylbenzene, cumene, butylbenzene, isobutylbenzene, sec-butylbenzene, pentylbenzene, diethylbenzene, mesitylene, xylene, cresol, ethylphenol, dimethoxybenzene, dimethoxytoluene, benzyl alcohol, tolyl carbinol, cumyl alcohol, acetophenone, propiophenone, hexane, pentane, heptane, octane, cyclohexane, cyclopentane, cycloheptane, cyclooctane, and petroleum fractions (e.g., petroleum ether and benzene) (the third group).

The first group of solvents given above can be used singly satisfactorily. The second group of solvents, which can certainly be used singly, should desirably be mixed with the first group of solvents. Since each of these first and second groups of solvents exhibits a decoloring capability, these solvents can be mixed at an arbitrary mixing ratio. Where a solvent of the second group is mixed with a solvent of the third group, the mixing ratio is not particularly limited as far as the mixed solvents exhibit a sufficient decoloring capability. However, it is desirable for the mixing amount of the third group solvent to fall within the range of between 20 and 80 wt %. It is also possible to use a third group solvent together with a first group solvent. In this case, the mixing amount of the third group solvent should be 90 wt % or less. Further, it is possible to use first, second, and third group solvents together. In this case, it is desirable for the mixing amount of the third group solvent to be 80 wt % or less.

When a natural material such as ethylbutylate (pineapple oil) having very small influence on the environment is used as a solvent, no problem arises during disposal of the solvent even if the solvent remains. For efficiently decoloring the image forming material, it is desirable to heat in advance the solvent. In this case, the solvent temperature should desirably fall within the range of between 40° C. and 150° C.

EXAMPLES

In the following examples, images were formed on copy sheets (500BLATT manufactured by NEUSIEDLER, pH=9.4) normally used in Europe. The sheet reflection density was measured with a Macbeth densitometer.

Example 1

Two parts by weight of 3-(4-dimethylamino-2-ethoxyphenyl)-3-(1-ethyl-2-methyli ndol-3-yl)-4-azaphthalide as a color former, 1.5 parts by weight of propyl gallate as a developer, 1 part by weight of polypropylene wax as a wax component, 18 parts by weight of potato starch as a polymer decolorizer, 77.5 parts by weight of polystyrene having a molecular weight of 45,000 as a binder resin, and 1 part by weight of a charge control agent (LR-147 manufactured by Nippon Carret Inc.) were mixed, and the mixture was well kneaded using a kneader. The kneaded product was pulverized by a pulverizer to obtain a powder having an average particle size of 10 µm. One wt % of hydrophobic silica was externally added to the resultant powder to manufacture blue electrophoto-graphic toner.

The manufactured toner was put into a toner cartridge of a plain paper copier (Premage 38 manufactured by TOSHIBA CORP.), and an image for evaluation was transferred onto a copy sheet. The reflection density of the formed image was about 1.3, indicating sufficient reflection density.

Also, no offset occurred when this toner was used. This is presumably because starch has a high affinity for paper fibers, so the softened starch has a function of adhering the image forming material to paper.

The paper sheets on which the images were formed were dipped in solvents shown in Table 1 for 20 sec to erase the images, and the paper sheets were air-dried. Also, a paper sheet on which an image was formed was passed through a heat roller set at 200° C. to erase the image. Table 1 shows the results of measurements of the reflection densities of the paper sheets from which the images were erased.

The erased states obtained by the solvents were very good; no residual image resulting from a flow of the dye components or a blur was observed. However, a slight difference was found because of the difference of the light scattering between the decolored image forming material and paper. The erased state obtained by heating was also good. The reflection densities remained unchanged even after the paper sheets from which the images were erased were left to stand at 60° C. for 300 hr.

TABLE 1

| Erase solvent | Reflection density after erasure |
|---|---|
| Methyl ethyl ketone | 0.06 |
| Diethoxyethane | 0.06 |
| Methyl ethyl ketone:ethanol = 1:1 (volume ratio) | 0.06 |
| Diethoxyethane:isopropyl alcohol = 1:1 (volume ratio) | 0.06 |
| Ethyl lactate | 0.06 |
| Heat roller (200° C.) | 0.06 |

Reference Example 1

Eighteen parts by weight of cholic acid as a low-molecular decolorizer were used instead of 18 parts by weight of potato starch used as a polymer decolorizer in Example 1. Following the same procedures as in Example 1, a color former, developer, wax component, low-molecular decolorizer, binder resin, and charge control agent were mixed, and the mixture was well kneaded using a kneader. The kneaded product was pulverized by a pulverizer to obtain a powder having an average particle size of 10 μm. One wt % of hydrophobic silica was externally added to the resultant powder to manufacture blue electrophotographic toner.

As in Example 1, the manufactured toner was put into a toner cartridge of a plain paper copier, and an image for evaluation was transferred onto a copy sheet. The reflection density of the formed image was about 1.3. The paper sheet on which the image was formed was dipped in ethoxyethane for 20 sec to erase the image, and the paper sheet was air-dried. The reflection density of the paper sheet from which the image was erased was about 0.06, substantially the same value as in Example 1. However, a very slight blur probably resulting from a flow of the dye components was locally observed. This blur could be erased by passing the paper sheet through a heat roller, and a good erased state was obtained. The reflection density remained unchanged even after the paper sheet from which the image was erased was left to stand at 60° C. for 300 hr.

Example 2

Two parts by weight of 3-(4-dimehylamino-2-ethoxyphenyl)-3-(1-ethyl-2-methylin dol-3-yl)-4-azaphthalide as a color former, 1.5 parts by weight of propyl gallate as a developer, 1 part by weight of polypropylene wax as a wax component, 10 parts by weight of (prepulverized) cellulose acetates having different acetylation degrees as shown in Table 2 as polymer decolorizers, 85.5 parts by weight of a styrene-acrylate copolymer having an acrylate content of 5 wt % as a binder resin, and 1 part by weight of a charge control agent (LR-147) were mixed, and the mixtures were well kneaded using a kneader. The kneaded products were pulverized by a pulverizer to obtain powders having an average particle size of 10 μm. One wt % of hydrophobic silica was externally added to the resultant powders to manufacture blue electro-photographic toners.

Each manufactured toner was put into a toner cartridge of a plain paper copier, and an image for evaluation was transferred onto a copy sheet. Table 2 shows the reflection densities of the formed images. Note that no offset occurred when these toners of this example were used. This is presumably because cellulose acetate has a high affinity for paper fibers, so the softened cellulose acetate has a function of adhering the image forming material to paper.

The paper sheets on which the images were formed were dipped in methylethylketone for 20 sec to erase the images, and the paper sheets were air-dried. Table 2 shows the results of measurements of the reflection densities of the paper sheets from which the images were erased.

As shown in Table 2, the reflection density of the colored image was unsatisfactory depending on the acetylation degree of cellulose acetate. However, the erased states obtained by the solvent were very good; no residual image resulting from a flow of the dye components or a blur was observed. The reflection densities remained unchanged even after the paper sheets from which the images were erased were left to stand at 60° C. for 300 hr.

TABLE 2

| Acetylation degree (%) | Reflection density in colored state | Reflection density after erasure |
|---|---|---|
| 55 | 0.90 | 0.06 |
| 57 | 1.05 | 0.06 |
| 59 | 1.20 | 0.06 |
| 61 | 1.30 | 0.06 |

Reference Example 2

Ten parts by weight of cholic acid as a low-molecular decolorizer were used instead of 10 parts by weight of cellulose acetate used as a polymer decolorizer in Example 2. Following the same procedures as in Example 2, a color former, developer, wax component, low-molecular decolorizer, binder resin, and charge control agent were mixed, and the mixture was well kneaded using a kneader. The kneaded product was pulverized by a pulverizer to obtain a powder having an average particle size of 10 μm. One wt % of hydrophobic silica was externally added to the resultant powder to manufacture blue electrophoto-graphic toner.

As in Example 2, the manufactured toner was put into a toner cartridge of a plain paper copier, and an image for evaluation was transferred onto a copy sheet. The reflection density of the formed image was about 1.5. The paper sheet on which the image was formed was dipped in methylethylketone for 20 sec to erase the image, and the paper sheet was air-dried. The reflection density of the paper sheet from which the image was erased was about 0.06, substantially the same value as in Example 2. However, a very slight blur probably resulting from a flow of the dye components was locally observed. This blur could be erased by passing the paper sheet through a heat roller, and a good erased state was obtained. The reflection density remained unchanged even after the paper sheet from which the image was erased was left to stand at 60° C. for 300 hr.

Example 3

Two parts by weight of 3-(4-dimehylamino-2-ethoxyphenyl)-(1-ethyl-2-methylindo 1-3-yl)-4-azaphthalide as a color former, 1.5 parts by weight of propyl gallate as a developer, 1 part by weight of polypropylene wax as a wax component, 8 parts by weight of cellulose acetate having an acetylation degree of 52% as a polymer decolorizer, 7 parts by weight of cholic acid as a low-molecular decolorizer, 80.5 parts by weight of a styrene-acrylate copolymer having an acrylate content of 5 wt % as a binder resin, and 1 part by weight of a charge control agent (LR-147) were mixed, and the mixture was well kneaded using a kneader. The kneaded product was pulverized by a pulverizer to obtain a powder having an average particle size of 10 μm. One wt % of hydrophobic silica was externally added to the resultant powder to manufacture blue electrophotographic toner.

The manufactured toner was put into a toner cartridge of a plain paper copier, and an image for evaluation was transferred onto a copy sheet. Note that no offset occurred when this toner was used. The paper sheet on which the image was formed was dipped in methylethylketone for 20 sec to erase the image, and the paper sheet was air-dried. The reflection density of the paper sheet from which the image was erased was 0.05, indicating a very good erased state. The reflection density remained unchanged even after the paper sheet from which the image was erased was left to stand at 60° C. for 300 hr. Furthermore, when erasure and overwriting were repeated 10 times, an image substantially the same as the first image was obtained.

Example 4

Two parts by weight of 3-(4-dimehylamino-2-ethoxyphenyl)-3-(-ethyl-2-methylin dol-3-yl)-4-azaphthalide as a color former, 1.5 parts by weight of propyl gallate as a developer, 1 part by weight of polypropylene wax as a wax component, 10 parts by weight of (prepulverized) polyvinyl alcohols having different acetylation degrees as shown in Table 3 as polymer decolorizers, 85.5 parts by weight of a styrene-acrylate copolymer having an acrylate content of 5 wt % as a binder resin, and 1 part by weight of a charge control agent (LR-147 manufactured by Nippon Carret Inc.) were mixed, and the mixtures were well kneaded using a kneader. The kneaded products were pulverized by a pulverizer to obtain powders having an average particle size of 10 μm. One wt % of hydrophobic silica was externally added to the resultant powders to manufacture blue electrophotographic toners.

Each manufactured toner was put into a toner cartridge of a plain paper copier, and an image for evaluation was transferred onto a copy sheet. Table 3 shows the reflection densities of the formed images. Note that no offset occurred when these toners of this example were used.

The paper sheets on which the images were formed were dipped in diethoxyethane for 20 sec to erase the images, and the paper sheets were air-dried. Table 3 shows the results of measurements of the reflection densities of the paper sheets from which the images were erased.

As shown in Table 3, the reflection density of the colored image was unsatisfactory depending on the acetylation degree of polyvinyl alcohol. However, the erased states obtained by the solvent were very good; no residual image resulting from a flow of the dye components or a blur was observed. The reflection densities remained unchanged even after the paper sheets from which the images were erased were left to stand at 60° C. for 300 hr.

TABLE 3

| Acetylation degree (%) | Reflection density in colored state | Reflection density after erasure |
| --- | --- | --- |
| 39 | 1.10 | 0.06 |
| 62 | 1.30 | 0.06 |
| 78 | 1.30 | 0.06 |
| 100 (Polyvinyl acetate) | 1.35 | 0.06 |

Example 5

Two parts by weight of 3-(4-dimehylamino-2-ethoxyphenyl)-3-(1-ethyl-2-methylin dol-3-yl)-4-azaphthalide as a color former, 1.5 parts by weight of propyl gallate as a developer, 1 part by weight of polypropylene wax as a wax component, 10 parts by weight of (prepulverized) polymer compounds having amino groups represented by formulas (1) to (3) below, 85.5 parts by weight of a styrene-acrylate copolymer having an acrylate content of 5 wt % as a binder resin, and 1 part by weight of a charge control agent (LR-147) were mixed, and the mixtures were well kneaded using a kneader. The kneaded products were pulverized by a pulverizer to obtain powders having an average particle size of 10 μm. One wt % of hydrophobic silica was externally added to the resultant powders to manufacture blue electrophotographic toners.

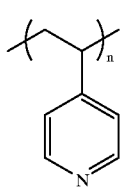

(1)

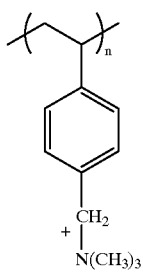

(2)

(3)

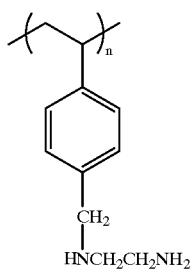

Each manufactured toner was put into a toner cartridge of a plain paper copier, and an image for evaluation was transferred onto a copy sheet. Table 4 shows the reflection densities of the formed images. Note that no offset occurred when these toners of this example were used.

The paper sheets on which the images were formed were dipped in methylethylketone for 20 sec to erase the images, and the paper sheets were air-dried. Table 4 shows the results of measurements of the reflection densities of the paper sheets from which the images were erased.

As shown in Table 4, a very good erased state was obtained by the solvent when any of the toners containing polymer decolorizers (1) to (3) was used; no residual image resulting from a flow of the dye components or a blur was observed. The reflection densities remained unchanged even after the paper sheets from which the images were erased were left to stand at 60° for 300 hr.

TABLE 4

| Polymer decolorizer | Reflection density in colored state | Reflection density after erasure |
| --- | --- | --- |
| (1) | 1.35 | 0.06 |
| (2) | 1.15 | 0.05 |
| (3) | 1.35 | 0.06 |

Example 6

0.3 g of leuco dye Red 52 (manufactured by Yamada Chemical Co. Ltd.) as a color former, 0.3 g of propyl gallate as a developer, and 3 g of potato starch as a polymer decolorizer were added to a toluene solution in which 0.2% of amorphous polyolefin (Zeonex 450 manufactured by Nippon Zeon Co. Ltd.) was dissolved. The resultant solution was dispersed for 1 hr by using a paint shaker to prepare liquid ink. This liquid ink was put into a stationary part (FV-0200 available from I & J FISNER Inc.) to manufacture a write pen.

A 1 cm×1 cm solid pattern was drawn on a copy sheet with this write pen. The reflection density of the drawn image was 1.35.

Separately, erase solvents shown in Table 5 were put into identical stationary parts to manufacture erase pens. The image on each paper sheet was erased as it was rubbed back and forth three times with a felt-tip from which each solvent oozed out, and the paper sheet was air-dried. Also, a paper sheet on which an image was formed was passed through a heat roller set at 200° C. to erase the image. Table 5 shows the results of measurements of the reflection densities of the paper sheets from which the images were erased.

The erased states obtained by the solvents were very good; no residual image resulting from a flow of the dye components or a blur was observed. The erased state obtained by heating was also good. The reflection densities remained unchanged even after the paper sheets from which the images were erased were left to stand at 60° C. for 300 hr.

TABLE 5

| Erase solvent | Reflection density after erasure |
| --- | --- |
| Methyl ethyl ketone | 0.06 |
| Diethoxyethane | 0.06 |
| Isopropyl alcohol | 0.06 |
| Ethanol | 0.06 |
| Aqueous calcium carbonate solution of pH 12 | 0.07 |
| Heat roller (200° C.) | 0.09 |

Example 7

Propyl gallate, potato starch, 1-docosanol, and stearyl alcohol were mixed at a weight ratio of 1:10:5:5, and the mixture was well stirred at 110° C. The resultant mixture was rapidly cooled and solidified by spreading it in a vat. The obtained solid material was finely milled in a mortar to form a masterbatch.

Leuco dye DEPM (manufactured by Yamada Chemical Co. Ltd.) was prepared as a color former and added to the masterbatch such that the molar ratio of propyl gallate was 2.5 times that of DEPM. The resultant material was again stirred under heating to 110° C. This mixture was poured into a mold to manufacture crayon.

A 1 cm×1 cm solid pattern was drawn on a copy sheet with this crayon. The reflection density of the drawn image was 1.35.

Separately, the erase solvents shown in Table 6 were put into stationary parts (FV-0200 available from I & J FISNER Inc.) to manufacture erase pens. The image on each paper sheet was erased as it was rubbed back and forth three times with a felt-tip from which each solvent oozed out, and the paper sheet was air-dried. Also, a paper sheet on which an image was formed was passed through a heat roller set at 200° C. to erase the image. Table 6 shows the results of measurements of the reflection densities of the paper sheets from which the images were erased.

The erased states obtained by the solvents were very good; no residual image resulting from a flow of the dye components or a blur was observed. The erased state obtained by heating was also good. The reflection densities remained unchanged even after the paper sheets from which the images were erased were left to stand at 60° C. for 300 hr.

TABLE 6

| Erase solvent | Reflection density after erasure |
| --- | --- |
| Methyl ethyl ketone | 0.06 |
| Diethoxyethane | 0.06 |
| Isopropyl alcohol | 0.06 |
| Ethanol | 0.06 |
| Aqueous calcium carbonate Solution of pH 12 | 0.07 |
| Heat roller (200° C.) | 0.08 |

Example 8

Two parts by weight of GN-169 (manufactured by Yamamoto Kasei K.K.) as a color former, 1 part by weight of propyl gallate as a developer, 18 parts by weight of an ethylene vinyl acetate copolymer (ELVAX200W manufactured by Mitsui-Du Pont Polychemical Inc.), 64 parts by weight of rice wax as a wax component, and 15 parts by weight of corn starch as a polymer decolorizer were mixed, and the mixture was well kneaded using a three-roll kneader. A film was coated with about 5 g/m$^2$ of the kneaded product by using a hot melt coater to manufacture a blue thermal transfer ink ribbon.

This thermal transfer ink ribbon was used to form an image (barcode) on a thermal transfer paper sheet by using a barcode printer (B-300) manufactured by TEC. The reflection density of the formed image was about 0.7.

The paper sheet on which the image was formed was dipped in 2-butanone for 20 sec to erase the image, and the paper sheet was air-dried. The reflection density of the paper sheet from which the image was erased was 0.06. No residual image resulting from a flow of the dye components or a blur was observed. The reflection density remained unchanged even after the paper sheet from which the image was erased was left to stand at 60° C. for 300 hr.

Note that a slightly yellowish portion was observed after the paper sheet was left to stand at the high temperature depending on the acid value of the wax used. This change of properties increased as the acid value and hydroxyl group value of the wax increased.

Example 9

High-amylose corn starch was used as a polymer decolorizer, and n-propyl gallate was used as a developer. Several mixtures of high-amylose corn starch and n-propyl gallate having different mixing ratios were mixed prepared and were subjected to DSC analysis as shown in FIGS. 1 to 4. As a result, it was found that optimum high-amylose corn starch content was 3 to 50 times by weight of n-propyl gallate.

Then, one part by weight of 3-(4-dimehylamino-2-ethoxyphenyl)-3-(1-ethyl-2-methylindol-3-yl)-4-azaphthalide as a color former, 1 part by weight of n-propyl gallate as a developer, 1 part by weight of high-amylose corn starch as a polymer decolorizer, 1 part by weight of polypropylene wax as a wax component, 85 parts by weight of polystyrene having a molecular weight of 45,000 as a binder resin, and 1 part by weight of a charge control agent (LR-147 manufactured by Nippon Carret Inc.) were mixed, and the mixture was well kneaded using a kneader. The kneaded product was pulverized by a pulverizer to obtain a powder having an average particle size of 10 μm. One wt % of hydrophobic silica was externally added to the resultant powder to manufacture blue electrophoto-graphic toner (1).

The high-amylose corn starch contained in the toner (1) was less than the lower limit of the above-mentioned optimum range. The toner (1) was placed in a cell, and an optical density of the toner (1) was measured with a calorimeter (CR-300 manufactured by MINOLTA CORP.). The optical density of the toner (1) was 0.9.

The toner (1) was put into a toner cartridge of a plain paper copier (Premage 38 manufactured by TOSHIBA CORP.), and an image for evaluation was transferred onto a copy sheet. The reflection density of the formed image was 0.6. The paper sheet on which the image was formed was dipped in methyl ethyl ketone for 20 sec to erase the image, and the paper sheet was air-dried. However, an unerased blur image was remained on the paper sheet. The reflection density of the unerased blur image was 0.2.

Next, one part by weight of 3-(4-dimehylamino-2-ethoxyphenyl)-3-(1-ethyl-2-methylindol-3-yl)-4-azaphthalide as a color former, 1 part by weight of n-propyl gallate as a developer, 18 parts by weight of high-amylose corn starch as a polymer decolorizer, 1 part by weight of polypropylene wax as a wax component, 78 parts by weight of polystyrene having a molecular weight of 45,000 as a binder resin, and 1 part by weight of a charge control agent (LR-147) were mixed, and the mixture was well kneaded using a kneader. The kneaded product was pulverized by a pulverizer to obtain a powder having an average particle size of 10 μm. One wt % of hydrophobic silica was externally added to the resultant powder to manufacture blue electrophotographic toner (2).

The high-amylose corn starch content in the toner (2) was within the above-mentioned optimum range. The toner (2) was placed in a cell, and an optical density of the toner (2) was measured with a calorimeter (CR-300). The optical density of the toner (2) was 0.8.

The toner (2) was put into a toner cartridge of a plain paper copier (Premage 38), and an image for evaluation was transferred onto a copy sheet. The reflection density of the formed image was 0.5. The paper sheet on which the image was formed was dipped in methyl ethyl ketone for 20 sec to erase the image, and the paper sheet was air-dried. The image was completely erased. The reflection density of the region where the image was formed was 0.06.

Further, one part by weight of 3-(4-dimehylamino-2-ethoxyphenyl)-3-(1-ethyl-2-methylindol-3-yl)-4-azapht halide as a color former, 1 part by weight of n-propyl gallate as a developer, 60 parts by weight of high-amylose corn starch as a polymer decolorizer, 1 part by weight of polypropylene wax as a wax component, 36 parts by weight of polystyrene having a molecular weight of 45,000 as a binder resin, and 1 part by weight of a charge control agent (LR-147) were mixed, and the mixture was well kneaded using a kneader. The kneaded product was pulverized by a pulverizer to obtain a powder having an average particle size of 10 μm. One wt % of hydrophobic silica was externally added to the resultant powder to manufacture blue electrophotographic toner (3).

The high-amylose corn starch content in the toner (3) was higher than the upper limit of the above-mentioned optimum range. The toner (3) was placed in a cell, and an optical density of the toner (3) was measured with a calorimeter (CR-300). The optical density of the toner (3) was 0.15. Thus, such a toner as toner (3) in which the polymer decolorizer content is too high cannot be used as an image forming material.

Example 10

Three parts by weight of 2-anilino-6-(N-ethyl-N-isobutylamino)-3-methylfluoran as a color former, 2 parts by weight of 2,3,4-trihydroxybenzophenone as a developer, 94 parts by weight of polystyrene as a binder resin, and 1 part by weight of a charge control agent (E-84 manufactured by Orient Kagaku K.K.) were mixed, and the mixture was well kneaded using a kneader. The kneaded product was pulverized by a pulverizer to form a black powder having an average particle size of 10 μm.

Separately, 87 parts by weight of styrene-butylacrylate (acrylate content 30 wt %) as a polymer filler, 10 parts by weight of cholic acid as a decolorizer, 2 parts by weight of stearone as a wax component, and 1 part by weight of the charge control agent (E-84) were mixed, and the mixture was well kneaded using a kneader. The kneaded product was pulverized by a pulverizer to form a colorless powder having an average particle size of 1 μm.

Sixty parts by weight of the former black powder and 40 parts by weight of the latter colorless powder were mixed. One wt % of hydrophobic silica was externally added to the mixture, and the resultant material was stirred by a Henschel mixer to manufacture black electrophotographic toner.

The manufactured toner was put into a toner cartridge of a plain paper copier, and an image for evaluation was copied onto a copy sheet. The reflection density of the formed image was about 1.0. This paper sheet was dipped in 2-butanone to erase the image and air-dried. The reflection density of the paper sheet after the image was erased was about 0.07, indicating a good erased state. The reflection density remained unchanged even after the paper sheet from which the image was erased was left to stand at 60° C. for 300 hr. Furthermore, when erasure and overwriting were repeated 10 times, an image substantially the same as the first image was obtained.

Example 11

2.5 parts by weight of 2-anilino-6-(N-ethyl-N-isobutylamino)-3-methylfluoran as a color former, 1.5 parts by weight of propyl gallate as a developer, 1 part by weight of rice alcohol as a wax component, 15 parts by weight of cholic acid as a decolorizer, 79 parts by weight of polystyrene as a binder resin, and 1 part by weight of a charge control agent (LR-147) were mixed, and the mixture was well kneaded using a kneader. The kneaded product was pulverized by a pulverizer to form a powder having an average particle size of 8 $\mu$m.

The charge control agent (LR-147) and the powder manufactured by the above process were added to a solution prepared by dissolving 5 wt % of polyhydroxyethylmethacrylate having a softening point of about 50° C. as a polymer filler in acetone. The resultant solution was stirred and spray-dried. One wt % of hydrophobic silica was externally added to the obtained powder to manufacture black electrophoto-graphic toner. In this manner, microcapsulated erasable toner in which the surfaces of toner particles were covered with the polymer filler was manufactured.

The manufactured toner was put into a toner cartridge of a plain paper copier, and an image for evaluation was copied onto a copy sheet. The fixing temperature was set at 140° C. The reflection density of the formed image was about 1.0. This paper sheet was dipped in diethoxyethane to erase the image and air-dried. The reflection density of the paper sheet after the image was erased was 0.06, and an image blur was locally observed. This blur could be erased by passing the paper sheet through a heat roller, and a good erased state was obtained. The reflection density remained unchanged even after the paper sheet from which the image was erased was left to stand at 60° C. for 300 hr.

Next, microcapsulated erasable toner was manufactured following the same procedures as above except that one wt % of cholic acid as a decolorizer was added to the acetone solution of polyhydroxyethylmethacrylate prepared in the above process. In the same manner as above, the manufactured toner was used to form an image, and the image was erased. Consequently, the reflection density of the paper sheet after the image was erased was 0.05, indicating a better erased state. The reflection density remained unchanged even after the paper sheet from which the image was erased was left to stand at 60° C. for 300 hr. Furthermore, when erasure and overwriting were repeated 10 times, an image substantially the same as the first image was obtained.

Example 12

Three parts by weight of 2-anilino-6-(N-ethyl-N-isobutylamino)-3-methylfluoran as a color former, 2 parts by weight of 2,3,4-trihydroxybenzophenone as a developer, 10 parts by weight of cholic acid as a decolorizer, 84 parts by weight of polystyrene as a binder resin, and 1 part by weight of a charge control agent (E-84 manufactured by Orient Kagaku K.K.) were mixed, and the mixture was well kneaded using a kneader. The kneaded product was pulverized by a pulverizer to form a black powder having an average particle size of 8 $\mu$m.

Separately, 87 parts by weight of styrene-butylacrylate having an acrylate content of 30 wt % as a polymer filler, 10 parts by weight of cholic acid as a decolorizer, 2 parts by weight of stearone as a wax component, and 1 part by weight of the charge control agent (E-84) were mixed, and the mixture was well kneaded using a kneader. The kneaded product was pulverized by a pulverizer to form a colorless powder having an average particle size of 1 $\mu$m.

Sixty parts by weight of the former black powder and 40 parts by weight of the latter colorless powder were mixed. One wt % of hydrophobic silica was externally added to the mixture, and the resultant material was stirred by a Henschel mixer to manufacture black electrophotographic toner.

The manufactured toner was put into a toner cartridge of a plain paper copier, and an image for evaluation was transferred onto a copy sheet. The reflection density of the formed image was about 1.0. This paper sheet was dipped in 2-butanone to erase the image and air-dried. The reflection density of the paper sheet after the image was erased was about 0.06, and neither a toner flow nor an image blur was observed. The reflection density remained unchanged even after the paper sheet from which the image was erased was left to stand at 60° C. for 300 hr. Furthermore, when erasure and overwriting were repeated 10 times, an image substantially the same as the first image was obtained.

Example 13

Six parts by weight of 2-chloro-6-(dimethylamino)fluoran as a color former, 4 parts by weight of methyl gallate as a developer, 89 parts by weight of amorphous polyolefin as a binder resin, and 1 part by weight of a charge control agent (LR-147) were mixed, and the mixture was well kneaded using a kneader. The kneaded product was pulverized by a pulverizer to form a red powder having an average particle size of about 1 $\mu$m.

Sixty parts by weight of this powder, 38 parts by weight of styrene-butylacrylate (acrylate content 30 wt %) as a polymer filler, 1 part by weight of polyethylene wax as a wax component, and 1 part by weight of the charge control agent (LR-147) were mixed, and the mixture was well kneaded using a kneader. The kneaded product was pulverized by a pulverizer to form a red powder having an average particle size of about 10 $\mu$m. One wt % of hydrophobic silica was externally added to the obtained powder, and the powder was stirred by a Henschel mixer to manufacture red electrophotographic toner.

The manufactured toner was put into a toner cartridge of a plain paper copier, and an image for evaluation was copied onto a copy sheet. The reflection density of the formed image was about 1.0. This paper sheet was dipped in a 2-butanone/toluene solvent mixture to erase the image and air-dried. The reflection density of the paper sheet after the image was erased was 0.10. Although a slight residual image was observed, neither toner flow nor an image blur was observed. This residual image could be erased by passing the paper sheet through a heat roller, and a good erased state was obtained. The reflection density remained unchanged even after the paper sheet from which the image was erased was left to stand at 60° C. for 300 hr.

Next, toner was manufactured following the same procedures as above except that 5 parts by weight of the 38 parts by weight of styrene-butylacrylate as a polymer filler were replaced with cholic acid as a decolorizer. In the same manner as above, the manufactured toner was used to form an image, and the image was erased. Consequently, the reflection density of the paper sheet after the image was erased was 0.07, indicating a better erased state. The reflection density remained unchanged even after the paper sheet from which the image was erased was left to stand at 60° C. for 300 hr. Furthermore, when erasure and overwriting were repeated 10 times, an image substantially the same as the first image was obtained.

Example 14

Six parts by weight of 2-N,N-dibenzylamino-6-dimethylaminofluoran as a color former, 4 parts by weight of methyl gallate as a developer, a mixture of 8 parts by weight of cholic acid, 1 part by weight of sitosterol, and 1 part by weight of D-glucose as a decolorizer, 79 parts by weight of amorphous polyolefin as a binder resin, and 1 part by weight of a charge control agent (LR-147) were mixed, and the mixture was well kneaded using a kneader. The kneaded product was pulverized by a pulverizer to form a green powder having an average particle size of about 1 μm.

Sixty parts by weight of this powder, 38 parts by weight of styrene-butylacrylate (acrylate content 30 wt %) as a polymer filler, 1 part by weight of polyethylene wax as a wax component, and 1 part by weight of the charge control agent (LR-147) were mixed, and the mixture was well kneaded using a kneader. The kneaded product was pulverized by a pulverizer to form a green powder having an average particle size of about 10 μm. One wt % of hydrophobic silica was externally added to the obtained powder, and the powder was stirred by a Henschel mixer to manufacture green electrophotographic toner.

The manufactured toner was put into a toner cartridge of a plain paper copier, and an image for evaluation was copied onto a copy sheet. The reflection density of the formed image was about 1.0. This paper sheet was dipped in a 2-butanone/toluene solvent mixture to erase the image and air-dried. The reflection density of the paper sheet after the image was erased was 0.08. Although a slight residual image was observed, neither a toner flow nor an image blur was observed. This residual image could be erased by passing the paper sheet through a heat roller, and a good erased state was obtained. The reflection density remained unchanged even after the paper sheet from which the image was erased was left to stand at 60° C. for 300 hr.

Next, toner was manufactured following the same procedures as above except that 5 parts by weight of the 38 parts by weight of styrene-butylacrylate as a polymer filler were replaced with cholic acid as a decolorizer. In the same manner as above, the manufactured toner was used to form an image, and the image was erased. Consequently, the reflection density of the paper sheet after the image was erased was 0.06, indicating a better erased state. The reflection density remained unchanged even after the paper sheet from which the image was erased was left to stand at 60° C. for 300 hr. Furthermore, when erasure and overwriting were repeated 10 times, an image substantially the same as the first image was obtained.

Example 15

Three parts by weight of 3-diethylamino-6-methyl-7-xylidinofluoran as a color former, 2 parts by weight of ethyl gallate as a developer, and 1 part by weight of polyethylene wax as a wax component were mixed and melted to form a homogenous composition. 0.5 g of hexamethylenebischloroformate was mixed in 40 g of this composition, and the mixture was melted. This mixture was dropped into 200 g of an aqueous solution containing 5 wt % of gelatin and one wt % of ethyl gallate while the solution was kept stirred to form fine droplets. Additionally, a solution prepared by dissolving 3 g of hexamethylenediamine in 50 g of water was gradually dropped into the above solution while the solution was kept stirred at 40° C. for 5 hr. Consequently, hexamethylenebischloroformate reacted with hexamethylenediamine at the interface between the fine dye component droplets and water to synthesize insoluble solid polyurethane, forming microcapsules in which dye components were covered with polyurethane shells. These microcapsules were filtered out from this suspension and dried.

Separately, 90 parts by weight of cholic acid as a decolorizer and 10 parts by weight of polystyrene as a binder resin were dissolved in an ethanol/toluene solvent mixture heated to 60° C. to prepare a solution. This solution was sprayed to prepare decolorizer microcapsules having an average particle size of about 0.5 μm.

Six parts by weight of the dye component microcapsules, 1 part by weight of polyethylene wax as a wax component, 15 parts by weight of the decolorizer microcapsules, 77 parts by weight of a styrene-butylacrylate copolymer (acrylate content 40 wt %), and 1 part by weight of a charge control agent (E-1 manufactured by NIPPON KAYAKU CO. LTD.) were well kneaded using a kneader. The kneaded product was pulverized by a pulverizer to obtain a powder having an average particle size of 10 μm. One wt % of hydrophobic silica was externally added to the resultant powder to manufacture black electro-photographic toner.

The manufactured toner was put into a toner cartridge of a plain paper copier, and an image for evaluation was copied onto a copy sheet. The reflection density of the formed image was about 1.2. This paper sheet was passed through a heat roller at 200° C. to thermally destroy the microcapsules, dipped in a diethoxyethane/isopropyl alcohol solvent mixture to erase the image, and air-dried. The reflection density of the paper sheet after the image was erased was 0.06, and neither a toner flow nor an image blur was observed. The reflection density remained unchanged even after the paper sheet from which the image was erased was left to stand at 60° C. for 300 hr.

Example 16

Three parts by weight of 3-diethylamino-6-methyl-7-xylidinofluoran as a color former, 2 parts by weight of propyl gallate as a developer, and 1 part by weight of polyethylene wax as a wax component were mixed and melted to form a homogenous composition. 0.5 g of hexamethylenebischloroformate was mixed in 40 g of this composition, and the mixture was melted. This mixture was dropped into 200 g of an aqueous solution containing 5 wt % of gelatin and one wt % of ethyl gallate while the solution was kept stirred to form fine droplets. Additionally, a solution prepared by dissolving 3 g of hexamethylenediamine in 50 g of water was gradually dropped into the above solution while the solution was kept stirred at 40° C. for 5 hr. Consequently, hexamethylenebischloroformate reacted with hexamethylenediamine at the interface between the fine dye component droplets and water to synthesize insoluble solid polyurethane, forming microcapsules in which dye components were covered with polyurethane shells. The average particle size of these microcapsules was about 0.5 µm. The microcapsules were filtered out from this suspension and dried.

Three parts by weight of the microcapsules, 1 part by weight of a charge control agent (E-1 manufactured by NIPPON KAYAKU CO. LTD.), and 1 part by weight of polypropylene wax as a wax component were dispersed in 500 parts by weight of an acetone solution prepared by dissolving 10 wt % of styrene-butylacrylate (acrylate content 40 wt %) as a polymer filler and 10 wt % of cholic acid. This dispersion was sprayed to form a powder having an average particle size of about 10 µm. One wt % of hydrophobic silica was externally added to the resultant powder to manufacture a black electro-photographic toner.

The manufactured toner was put into a toner cartridge of a plain paper copier, and an image for evaluation was copied onto a copy sheet. The reflection density of the formed image was about 1.2. This paper sheet was passed through a heat roller at 200° C. to thermally destroy the microcapsules, dipped in diethoxyethane to erase the image, and air-dried. The reflection density of the paper sheet after the image was erased was 0.05, indicating a good erased state. The reflection density remained unchanged even after the paper sheet from which the image was erased was left to stand at 60° C. for 300 hr. Furthermore, when erasure and overwriting were repeated 10 times, an image substantially the same as the first image was obtained.

Example 17

Three parts by weight of 3-diethylamino-6-methyl-7-xylidinofluoran as a color former, 2 parts by weight of 2,3,4-trihydroxyacetophenone as a developer, 25 parts by weight of a cholic acid/cholesterol mixture (weight ratio 9:1) as a decolorizer, and 5 parts by weight of polypropylene wax as a wax component were mixed and melted to form a homogenous composition. 0.5 g of hexamethylenebischloroformate was mixed in 40 g of this composition, and the mixture was melted. This mixture was dropped into 200 g of an aqueous solution containing 5 wt % of gelatin and one wt % of ethyl gallate while the solution was kept stirred to form fine droplets. Additionally, a solution prepared by dissolving 3 g of hexamethylenediamine in 50 g of water was gradually dropped into the above solution while the solution was kept stirred at 40° C. for 5 hr. Consequently, hexamethylenebischloroformate reacted with hexamethylenediamine at the interface between the fine dye component droplets and water to synthesize solid polyurethane, forming microcapsules in which the dye components were covered with the polyurethane shells. The average particle size of these microcapsules was about 0.5 µm. The microcapsules were filtered out from this suspension and dried.

Three parts by weight of the microcapsules, 1 part by weight of a charge control agent (E-1 manufactured by NIPPON KAYAKU CO. LTD.), and 1 part by weight of polyethylene wax as a wax component were dispersed in 500 parts by weight of a 20 wt % acetone solution of styrene-butylacrylate (acrylate content 40 wt %) as a polymer filler. This dispersion was sprayed to form a powder having an average particle size of about 10 µm. One wt % of hydrophobic silica was externally added to the resultant powder to manufacture a black electro-photographic toner.

The manufactured toner was put into a toner cartridge of a plain paper copier, and an image for evaluation was copied onto a copy sheet. The reflection density of the formed image was about 1.0. This paper sheet was passed through a heat roller at 200° C. to thermally destroy the microcapsules, dipped in diethoxyethane to erase the image, and air-dried. The reflection density of the paper sheet after the image was erased was 0.07, and neither a toner flow nor an image blur was observed. The reflection density remained unchanged even after the paper sheet from which the image was erased was left to stand at 60° C. for 300 hr.

Next, toner was manufactured following the same procedures as above except that 10 wt % of the styrene-butylacrylate as a polymer filler were replaced by cholic acid as a decolorizer. In the same manner as above, the manufactured toner was used to form an image, and the image was erased. Consequently, the reflection density of the paper sheet after the image was erased was 0.05, indicating a better erased state. The reflection density remained unchanged even after the paper sheet from which the image was erased was left to stand at 60° C. for 300 hr. Furthermore, when erasure and overwriting were repeated 10 times, an image substantially the same as the first image was obtained.

Example 18

Three parts by weight of GN-169 (manufactured by Yamamoto Kasei K.K.) as a color former, 5 parts by weight of phthalic acid as a developer, 1 part by weight of polypropylene wax as a wax component, 90 parts by weight of polystyrene as a binder resin, and 1 part by weight of a charge control agent (LR-147) were mixed, and the mixture was well kneaded using a kneader. The kneaded product was pulverized by a pulverizer to obtain a powder having an average particle size of 10 µm. One wt % of hydrophobic silica was externally added to the resultant powder to manufacture blue electro-photographic toner.

The manufactured toner was put into a toner cartridge of a plain paper copier, and a barcode image was copied onto a copy sheet. The reflection density of the formed image was about 0.8. This barcode could be read by a barcode reader manufactured by TEC. This paper sheet was dipped in a water/acetone (1:1) solvent mixture to erase the image and air-dried. The reflection density of the paper sheet after the image was erased was 0.10, so it was impossible to read the barcode with the barcode reader. Although this erased state was stable at room temperature, the reflection density recovered to about 0.7 when the paper sheet was heated to 150° C. However, the image swelled and deformed to be indistinguishable, so the barcode could not be read by the barcode reader.

Example 19

Three parts by weight of Crystal Violet lactone (CVL) as a color former, 2 parts by weight of gallic acid-D-glucose monoester as a developer, 1 part by weight of polypropylene wax as a wax component, 93 parts by weight of polystyrene as a binder resin, and 1 part by weight of a charge control agent (LR-147) were mixed, and the mixture was well kneaded using a kneader. The kneaded product was pulverized by a pulverizer to obtain a powder having an average particle size of 10 µm. One wt % of hydrophobic silica was externally added to the resultant powder to manufacture blue electrophotographic toner.

The manufactured toner was put into a toner cartridge of a plain paper copier, and an image for evaluation was copied onto a copy sheet. The reflection density of the formed image was about 0.8. This paper sheet was dipped in a water/acetone (1:1) solvent mixture to erase the image and air-dried. The reflection density of the paper sheet after the image was erased was 0.08. Although this erased state was stable at room temperature, the reflection density recovered to about 0.7 when the paper sheet was heated to 150° C.

Next, toner was manufactured following the same procedures as above except that 5 parts by weight of the 93 parts by weight of polystyrene as a binder resin were replaced by 5 parts by weight of cholic acid as a decolorizer. In the same manner as above, the manufactured toner was used to form an image, and the image was erased. Consequently, the reflection density of the paper sheet after the image was erased was 0.05, indicating a better erased state. The reflection density remained unchanged even after the paper sheet from which the image was erased was left to stand at 60° C. for 300 hr. Furthermore, when erasure and overwriting were repeated 10 times, an image substantially the same as the first image was obtained.

Example 20

One part by weight of Crystal Violet lactone (CVL) as a color former, 1 part by weight of propyl gallate as a developer, 10 parts by weight of a decolorizer, 5 parts by weight of 1-docosanol as a wax component, and 0.5 part by weight of 2-octyldecanol were added to 135 parts by weight of cyclohexane. The resultant material was well stirred by using a paint shaker to prepare oil ink.

Using a pen made by putting this ink into a stationary part (FV-0200 manufactured by I & J FISNER Inc.), an image was handwritten on a copy sheet. The reflection density of this paper sheet was 0.05, and the image was visually unrecognizable. This state could be maintained for 1 hr at room temperature. The image appeared when the paper sheet was passed through a heat roller heated to 150° C. The reflection density of the image was about 0.9. Next, ethanol was put into a stationary part (FV-0200) to make an erase pen. This erase pen was moved back and forth on the image three times, and the solvent was dried to erase the image. The reflection density of the paper sheet after the image was erased was 0.05, and the image was visually unrecognizable. The reflection density remained unchanged even after the paper sheet from which the image was erased was left to stand at 60° C. for 300 hr. The image never appeared even when the paper sheet was again passed through the heat roller.

Example 21

Crystal Violet lactone as a color former, propyl gallate as a developer, and stearyl alcohol as a wax component were mixed at a weight ratio of 1:1:1. 20 parts by weight of this mixture and 1 part by weight of 2-ethyloctanol were added to toluene, and the resultant material was dissolved by heating.

Separately, Crystal Violet lactone and propyl gallate were dissolved in water until saturation was reached to prepare a saturated aqueous solution. Nitrogen substitution was performed by adding 500 mL of a toluene solution of an image forming material to 100 g of this saturated aqueous solution. The dispersion was cooled to −5° C. to form frozen image forming material droplets as cores of microcapsules. 26.5 g of methacrylonitrile were mixed in this dispersion. The resultant dispersion was stirred at 0° C. or less for 50 hr to form polymethacrylonitride around the image forming material droplets, thereby preparing colorless microcapsules having an average particle size of 0.8 $\mu$m. These microcapsules were filtered out and dried.

Three wt % of the microcapsules were dispersed in a 5 wt % gelatin/aqueous solution, and 0.1 wt % of diethyleneglycol was added to prepare colorless ink.

This ink was put into an ink cartridge of an ink jet printer (MJ-510C manufactured by EPSON CORP.) to print an image onto a paper sheet. The reflection density of this paper sheet was 0.05, and the image was visually unrecognizable. This state could be maintained for 100 hr at room temperature. The image was developed when the paper sheet was passed through a heat roller set at 130° C. The reflection density of the image was about 0.9. The paper sheet was dipped in diethoxyethane to erase the image and air-dried. The reflection density of the paper sheet after the image was erased was 0.07, and the image was visually unrecognizable. The reflection density remained unchanged even after the paper sheet from which the image was erased was left to stand at 60° C. for 300 hr. The image never appeared even when the paper sheet was again passed through the heat roller.

Next, an invisible image was printed on a paper sheet following the same procedures as above except that 5 wt % of methyl cholate were added as a decolorizer to an ink solution. This image was developed through the heat roller and erased by dipping the paper sheet in diethoxyethane. Consequently, the reflection density of the paper sheet was 0.05, indicating a better erased state. The reflection density remained unchanged even after the paper sheet from which the image was erased was left to stand at 60° C. for 300 hr.

Example 22

Two parts by weight of 3-(4-dimethylamino-2-ethoxyphenyl)-3-(1-ethyl-2-methyli ndole-3-yl)-4-azaphthalide as a color former, 2 parts by weight of propyl gallate as a developer, and 20 parts by weight of β-sitosterol as a reversible decolorizer were mixed and melted. The resultant material was pulverized by a pulverizer to obtain a powder having an average particle size of 1 $\mu$m. 15 wt % of the obtained powder were added to a 5 wt % gelatin/aqueous solution, and the solution was spray-dried to form microcapsules. Three wt % of the microcapsules were dispersed in a 5 wt % styrene-butylmethacrylate/toluene solution, and 5 wt % of methyl cholate as a decolorizer and 0.1 wt % of xylene were added to prepare blue ink.

This ink was put into an ink cartridge of an ink jet printer (MJ-510C manufactured by EPSON CORP.) to print an image onto a paper sheet. The reflection density of the image was 0.45. This paper sheet was passed through a line thermal head to make the image colorless (to form a latent image). The reflection density of this paper sheet was 0.06, and the image was visually unrecognizable. The image was developed when the paper sheet was passed through a heat roller set at 130° C. The reflection density of the image was about 0.9. In this example, the latent image formation and development could be repeated several times. The paper sheet was dipped in a diethoxyethane/ethanol solvent mixture to erase the image and air-dried. The reflection density of the paper sheet after the image was erased was 0.05, and the image was visually unrecognizable. The reflection density remained unchanged even after the paper sheet from which the image was erased was left to stand at 60° C. for 300 hr. The image never appeared even when the paper sheet was again passed through the heat roller.

Example 23

Twenty parts by weight of Crystal Violet lactone (CVL) as a color former, 20 parts by weight of propyl gallate as a developer, 10 parts by weight of 1-docosanol as a wax component, and 1 part by weight of glycerin were mixed and melted to form a homogenous composition. 0.5 g of hexamethylenebischloroformate was mixed in 40 g of this composition, and the mixture was melted. This mixture was dropped into 200 g of an aqueous solution containing 5 wt % of gelatin and one wt % of ethyl gallate while the solution was kept stirred to form fine droplets. Additionally, a solution prepared by dissolving 3 g of hexamethylenediamine in 50 g of water was gradually dropped into the above solution while the solution was kept stirred at 40° C. for 5 hr. Consequently, hexamethylenebischloroformate reacted with hexamethylenediamine at the interface between the fine dye component droplets and water to synthesize insoluble solid polyurethane, forming microcapsules in which dye components were covered with polyurethane shells. The average particle size of these microcapsules was 1 µm. The microcapsules were filtered out from this suspension and dried.

Six parts by weight of the microcapsules, 1 part by weight of polyethylene wax as a wax component, 82 parts by weight of a styrene-butylacrylate copolymer (acrylate content 40 wt %) as a binder resin, 5 parts by weight of cholic acid as a decolorizer, and 1 part by weight of a charge control agent (LR-147) were mixed, and the mixture was kneaded using a kneader. The kneaded product was pulverized by a pulverizer to obtain a powder having an average particle size of 10 µm. One wt % of hydrophobic silica was externally added to the resultant powder to manufacture colorless electrophotographic toner.

The manufactured toner was put into a toner cartridge of a plain paper copier, and an image for evaluation was copied onto a copy sheet. The reflection density of this paper sheet was 0.07, and the image was visually unrecognizable. The paper sheet was passed through two heat rollers set at 190° C. to thermally destroy the microcapsules, and the image was developed by removing glycerin. The reflection density of this image was about 1.2. The paper sheet was dipped in diethoxyethane and dried to erase the image. The reflection density of the paper sheet after the image was erased was 0.05, and the image was visually unrecognizable. The reflection density remained unchanged even after the paper sheet from which the image was erased was left to stand at 60° C. for 300 hr.

The image never appeared even when the paper sheet was again passed through the heat rollers.

Example 24

One part by weight of 2-anilino-6-(N-ethyl-N-isobutylamino)-3-methylfluoran as a color former, 1 part by weight propyl gallate as a developer, and 10 parts by weight of pregnenolone as a reversible decolorizer were mixed and melted to form a homogenous composition. This composition was pulverized by a pulverizer to obtain a powder having an average particle size of 1 µm. Fifteen wt % of the obtained powder were dispersed in a 5 wt % ethylcellulose/ethanol solution, and the solution was spray-dried to form microcapsules.

Six parts by weight of the microcapsules, 1 part by weight of polyethylene wax as a wax component, 82 parts by weight of a styrene-butylacrylate copolymer (acrylate content 40 wt %) as a binder resin, 10 parts by weight of cholic acid as a decolorizer, and 1 part by weight of a charge control agent (LR-147) were mixed, and the mixture was kneaded using a kneader. The kneaded product was pulverized by a pulverizer to obtain a powder having an average particle size of 10 µm. One wt % of hydrophobic silica was externally added to the resultant powder to manufacture electro-photographic toner.

The manufactured toner was put into a toner cartridge of a plain paper copier, and an image for evaluation was copied onto a copy sheet. The reflection density of the formed image was 0.37. This paper sheet was passed through a line thermal head to make the image colorless (to form a latent image). The reflection density of the paper sheet was 0.06, and the image was visually unrecognizable. The image was developed when the paper sheet was passed through a heat roller set at 190° C. The reflection density of the image was about 0.9. The paper sheet was dipped in diethoxyethane to erase the image and air-dried. The reflection density of the paper sheet after the image was erased was 0.05, and the image was visually unrecognizable. The reflection density remained unchanged even after the paper sheet from which the image was erased was left to stand at 60° C. for 300 hr.

The image never appeared even when the paper sheet was again passed through the heat roller.

Example 25

One part by weight of Crystal Violet lactone (CVL) as a color former, 1 part by weight of propyl gallate as a developer, and 10 parts by weight of pregnenolone as a reversible decolorizer were mixed and melted to form a homogenous composition. This composition was pulverized by a pulverizer to obtain a powder having an average particle size of 1 µm. 15 wt % of the obtained powder were dispersed in a 5 wt % gelatin/aqueous solution, and the solution was spray-dried to form blue microcapsules.

Fifteen parts by weight of the microcapsules, 50 parts by weight of paraffin wax as a wax component, 15 parts by weight of methyl cholate as a decolorizer, and 10 parts by weight of an ethylene vinyl acetate copolymer (ELVAX200W manufactured by Mitsui-Du Pont Polychemical Inc.) as a binder resin were mixed, and the mixture was kneaded using a three-roll kneader. A film was coated with about 7 g/m$^2$ of the kneaded product by using a hot melt coater to manufacture a blue thermal transfer ink ribbon.

This ink ribbon was set in a barcode printer (B-30 manufactured by TEC), and a barcode image was transferred onto a thermal transfer paper sheet (JW-Z103). The reflection density of this image was about 0.4. This paper sheet was passed through a line thermal head to make the image colorless (to form a latent image). The reflection density of the paper sheet was 0.06, and the barcode could not be read out. The paper sheet was passed through a heat roller set at 190° C. to develop the barcode image. The reflection density of the image was about 0.9. This barcode could be read by a barcode reader (BHT-5075-T manufactured by TEC). The paper sheet was dipped in diethoxyethane to erase the barcode image and air-dried. The reflection density of the paper sheet after the image was erased was 0.07, and the barcode image could not be read out. The reflection density remained unchanged even after the paper sheet from which the image was erased was left to stand at 60° C. for 300 hr. The image never appeared even when the paper sheet was passed through the heat roller.

Example 26

Using in-situ polymerization in which a monomer is polymerized around a core material as a catalyst, microcapsules of Crystal Violet lactone (CVL) as a color former and microcapsules of propyl gallate as a developer were prepared as follows.

First, a saturated aqueous solution of CVL was prepared. Five hundred mL of hexane were added to 100 g of this aqueous solution, and nitrogen substitution was performed. This dispersion was cooled to −50° C. to form frozen CVL droplets as cores of microcapsules. 26.5 g of a methacrylonitrile monomer were mixed in this dispersion. The dispersion was stirred at −30° C. or less for 50 hr to form polymethacrylonitrile around the CVL droplets, thereby preparing microcapsules having an average particle size of 8 μm.

Following the same procedures as above, microcapsules of propyl gallate having an average particle size of 8 μm were prepared.

Five parts by weight of the CVL microcapsules, 4 parts by weight of the propyl gallate microcapsules, and 92 parts by weight of a polystyrene oligomer (SANYO CHEMICAL INDUSTRIES, LTD.) were mixed, and the mixture was kneaded by a twin-screw extruder. The kneaded product was pulverized by a pulverizer to form a powder having an average particle size of 8 μm.

Seventy grams of the obtained powder were added to 300 g of a solution prepared by dissolving 10% of gelatin in water. The resultant solution was stirred and spray-dried to cover the surfaces of the powder particles with gelatin.

Fifty grams of this powder, 0.5 g of a charge control agent (FCA-1001N manufactured by FUJIKURA KASEI CO. LTD.), and methyl cholate as a decolorizer were added to a solution prepared by dissolving 30 g of a styrene-acrylate copolymer as a polymer filler in 320 g of toluene. This dispersion was spray-dried to form particles. The obtained particles were classified to form toner having a volume-average particle size of 10 μm. One wt % of hydrophobic silica was externally added to this toner to manufacture colorless electrophotographic toner. This toner and ferrite carrier (F-150 manufactured by Nippon Teppun K.K.) were mixed such that the toner density was 4%, thereby manufacturing a dual-component developer.

This toner was put into a toner cartridge of a plain paper copier (Leodry BD-8510 manufactured by TOSHIBA CORP.), and an image was copied onto a paper sheet. In this plain paper copier, the surface temperature of the fixing roller was set at about 200° C., and the surface temperature of the press roller was set at about 160° C. The toner transferred onto the paper sheet was colorless and transparent until the paper sheet reached the fixing device. When the paper sheet conveyed in the plain paper copier was sandwiched between the fixing roller and the press roller, heat was applied from both sides of the paper sheet to melt the internal resin of the toner. Simultaneously, the toner was pressed to break the microcapsule walls. Consequently, the color former and the developer as the cores of the microcapsules flowed and diffused into the molten binder resin, and the interaction between them developed color. After that, the molten binder resin was cooled and fixed on the paper sheet.

In this manner, a blue image was obtained. The reflection density of the image was as high as 1.2, and no fog was found. Even after copying was performed onto 100,000 copy sheets, no toner contamination was found in the plain paper copier.

The paper sheet on which the image was formed was dipped in a 2-butanone/ethyl alcohol (1:1) solvent mixture to erase the image, and the paper sheet was air-dried. The reflection density of the paper sheet after the image was erased was 0.06, and neither a toner flow nor an image blur was observed. The reflection density remained unchanged even after the paper sheet from which the image was erased was left to stand at 60° C. for 300 hr.

Example 27

Figure 9:
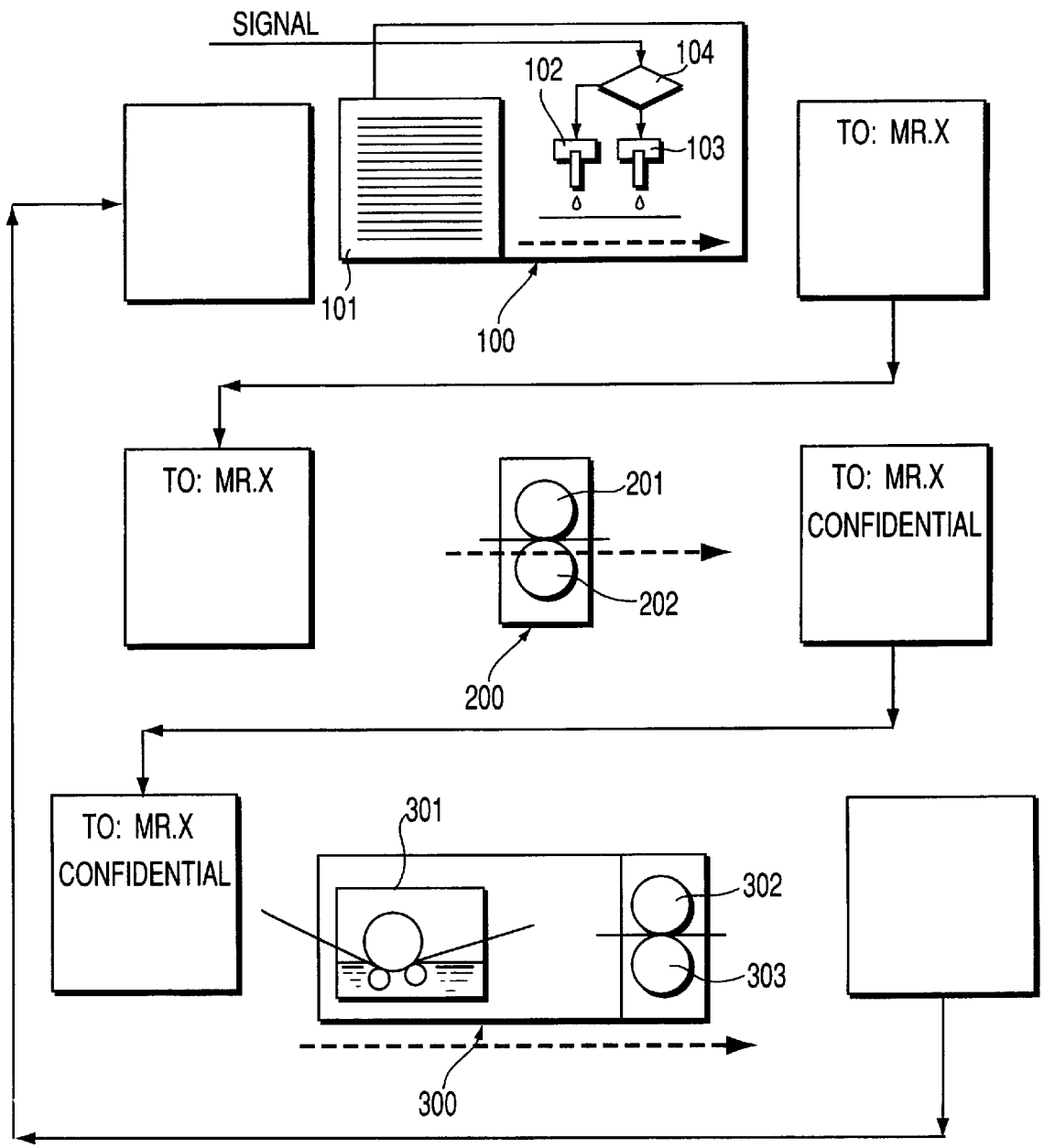
FIG. 9 is a schematic view showing the arrangement of a facsimile system using the image forming material of the present invention.

The image forming material of the present invention can be used to hold information security. A facsimile system shown in FIG. 9 will be taken as an example. This system comprises an ink jet output type facsimile apparatus 100, a heating type image developing apparatus 200, and a solvent dipping type image erasing apparatus 300.

The facsimile apparatus 100 has a sheet feeder 101, first and second ink jet devices 102 and 103, and a driving unit 104 for driving these ink jet devices. The first ink jet device 102 contains normally colored erasable ink. The second ink jet device 103 contains normally colorless erasable ink.

When receiving externally transmitted electronic information, the sheet feeder 101 feeds a paper sheet. This electronic information contains normal information and confidential information distinguishable from each other. The driving unit 104 includes a circuit for distinguishing between these pieces of information. The first ink jet device 102 containing the normally colored erasable ink records the normal information such as an address on a paper sheet. This normal information is visually recognizable on the paper sheet. The second ink jet device 103 containing the normally colorless erasable ink records the confidential information on the paper sheet. This confidential information is held as a visually unrecognizable latent image on the output paper sheet.

The heating type image developing apparatus 200 has a heat roller 201 and a counter roller 202 and is portable. The developing temperature is equal to or higher than the temperature at which the microcapsules are destroyed by heating and pressing and much lower than the temperature at which the image forming material decolors. A recipient who has received the output paper sheet puts the output paper sheet through the image developing apparatus 200. Consequently, the microcapsules contained in the normally colorless erasable ink are destroyed by heating and pressing, and the latent image is developed to be visually recognizable.

The image erasing apparatus 300 has a solvent dipping vat 301, a heat roller 302, and a counter roller 303. A polar organic solvent is used as an erase solvent. The temperature of the heat roller 302 is set at the erasing temperature of the erasable ink or higher. The recipient who has read the confidential information passes the paper sheet that is not necessary any longer through the image erasing apparatus 300. The paper sheet is dipped in the solvent, dried, and heated to return to a blank paper sheet.

The information does not appear even when this blank paper sheet is again passed through the heating type developing machine. Therefore, this blank paper sheet can be reused in the facsimile apparatus.

In this example, an image is formed by an ink jet system. However, electrophotography or thermal transfer can also be used. Although development is performed by heating, press development or solvent development is also usable. Additionally, information is erased by solvent dipping, but information can also be erased by heat provided that a good erased state is obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An erasable image forming material comprising a color former, a developer, a matrix agent, and a polymer decolorizer having an electron donating group capable of physically or chemically adsorbing said developer.

2. The material according to claim 1, wherein said polymer decolorizer is at least one compound selected from the group consisting of a polymer compound having a sugar skeleton, polyamino acid, a polymer compound having a hydroxyl group, a polymer compound having an amino group, polyvinylacetal, polyacrylonitrile, and copolymers thereof.

3. The material according to claim 1, wherein an average molecular weight of said polymer decolorizer is not less than 800.

4. The material according to claim 3, wherein the average molecular weight of said polymer decolorizer is not less than 10,000.

5. The material according to claim 2, wherein said polymer compound having a sugar skeleton is selected from the group consisting of starch, a grain powder containing starch as a main component, a starch derivative, a cellulose derivative, and a polysaccharide and a derivative thereof.

6. The material according to claim 1, wherein a compositional ratio of said decolorizer to said developer is within a range, the lower limit of which is determined by a compositional ratio where a reaction ratio between said developer and said decolorizer becomes 70% or more after erasure treatment, and the upper limit of which is determined by a compositional ratio where a reaction ratio between said developer and said decolorizer becomes 30% or less after said two components are mixed at a temperature for preparation of the image forming material.

7. The material according to claim 1, wherein contents of said developer and said polymer decolorizer are 0.1 to 10 parts by weight and 1 to 200 parts by weight, respectively, with respect to 1 part by weight of said color former.

8. The material according to claim 7, wherein the contents of said developer and said polymer decolorizer are 0.3 to 2 parts by weight and 3 to 50 parts by weight, respectively, with respect to 1 part by weight of said color former.

9. An erasable image fonning material comprising a color former, a developer, a matrix agent, and a polymer decolorizer, wherein said polymer decolorizer is at least one compound selected from the group consisting of a polymer compound having a sugar skeleton, polyamino acid, a polymer compound having a hydroxyl group, a polymer compound having an amino group, polyvinylacetal, polyacrylonitrile, and copolymers thereof.

10. The material according to claim 9, wherein an average molecular weight of said polymer decolorizer is not less than 800.

11. The material according to claim 10, wherein the average molecular weight of said polymer decolorizer is not less than 10,000.

12. The material according to claim 9, wherein said polymer compound having a sugar skeleton is selected from the group consisting of starch, a grain powder containing starch as a main component, a starch derivative, a cellulose derivative, and a polysaccharide and a derivative thereof.

13. The material according to claim 9, wherein a compositional ratio of said decolorizer to said developer is within a range, the lower limit of which is determined by a compositional ratio where a reaction ratio between said developer and said decolorizer becomes 70% or more after erasure treatment, and the upper limit of which is determined by a compositional ratio where a reaction ratio between said developer and said decolorizer becomes 30% or less after said two components are mixed at a temperature for preparation of the image forming material.

14. The material according to claim 9, wherein contents of said developer and said polymer decolorizer are 0.1 to 10 parts by weight and 1 to 200 parts by weight, respectively, with respect to 1 part by weight of said color former.

15. The material according to claim 14, wherein the contents of said developer and said polymer decolorizer are 0.3 to 2 parts by weight and 3 to 50 parts by weight, respectively, with respect to 1 part by weight of said color former.

* * * * *

UNITED STATES PATENT AND TRADEMARK OFFICE
CERTIFICATE OF CORRECTION

PATENT NO. : 6,203,603 B1
DATED : March 20, 2001
INVENTOR(S) : Satoshi Takayama, et al.

Page 1 of 1

It is certified that error appears in the above-identified patent and that said Letters Patent is hereby corrected as shown below:

Title page, item (75),
The 5th and 6th inventors have been omitted. Item (75) should read as follows:

-- (75) Inventors: Satoshi Takayama; Shigeru Machida, both of Kawasaki; Kenji Sano, Tokyo; Koichi Tsunemi, Chofu; Shuitsu Sato, Tokyo, Naru Ikeda, Taeko Urano, both Kawasaki, all of (JP) --

Signed and Sealed this

Eighteenth Day of September, 2001

*Attest:*

*Attesting Officer*

NICHOLAS P. GODICI
*Acting Director of the United States Patent and Trademark Office*